US012786652B2

(12) United States Patent
Lee et al.

(10) Patent No.: US 12,786,652 B2
(45) Date of Patent: Nov. 3, 2026

(54) ELECTRONIC DEVICE FOR CHANGING AUDIO SIGNAL BASED ON INFORMATION RELATED TO VISUAL OBJECT AND METHOD THEREOF

(71) Applicant: SAMSUNG ELECTRONICS CO., LTD., Suwon-si (KR)

(72) Inventors: Sanghoon Lee, Suwon-si (KR); Seonmi Kim, Suwon-si (KR); Hangil Moon, Suwon-si (KR); Kyoungho Bang, Suwon-si (KR); Jaemo Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 18/378,847

(22) Filed: Oct. 11, 2023

(65) Prior Publication Data

US 2024/0107251 A1 Mar. 28, 2024

Related U.S. Application Data

(63) Continuation of application No. PCT/KR2023/012442, filed on Aug. 22, 2023.

(30) Foreign Application Priority Data

Sep. 23, 2022 (KR) ........................ 10-2022-0120553
Nov. 2, 2022 (KR) ........................ 10-2022-0144819

(51) Int. Cl.
*H04S 7/00* (2006.01)
*G06F 3/16* (2006.01)
(Continued)

(52) U.S. Cl.
CPC .................. *H04S 7/30* (2013.01); *G06F 3/16* (2013.01); *G10L 21/055* (2013.01); *H04B 17/364* (2015.01)

(58) Field of Classification Search
CPC .......... G10L 21/055; G10L 25/57; G06F 3/16
See application file for complete search history.

(56) References Cited

U.S. PATENT DOCUMENTS 7,010,370 B1 * 3/2006 Riegelsberger ......... G10L 19/00 381/63
10,585,472 B2 3/2020 Tokubo et al.
(Continued)

FOREIGN PATENT DOCUMENTS

JP 2022-509761 A 1/2022
KR 10-0818660 B1 4/2008
(Continued)

OTHER PUBLICATIONS

International Search Report dated Dec. 7, 2023, issued by the International Searching Authority in International Application No. PCT/KR2023/012442.

(Continued)

*Primary Examiner* — Shaun Roberts
(74) *Attorney, Agent, or Firm* — Sughrue Mion, PLLC

(57) ABSTRACT

An electronic device obtains acoustic signals through a plurality of microphones of a microphone array, while displaying a visual object on a display. The electronic device obtains first information related to propagated characteristics of the acoustic signals in a space where the microphone array is provided, based on the obtained acoustic signals. The electronic device changes an audio signal corresponding to the visual object based on the first information and second information for displaying the visual object in the display. The electronic device provides the changed audio signal using a speaker.

20 Claims, 12 Drawing Sheets

(51) Int. Cl.
*G10L 21/055* (2013.01)
*H04B 17/364* (2015.01)

(56) References Cited

U.S. PATENT DOCUMENTS

| | | | | |
|---|---|---|---|---|
| 10,650,602 | B2 * | 5/2020 | You | G06T 7/593 |
| 10,679,648 | B2 | 6/2020 | Tomlin et al. | |
| 10,743,124 | B1 * | 8/2020 | Nelson | H04R 5/027 |
| 11,295,754 | B2 * | 4/2022 | Eubank | G10L 21/0272 |
| 11,477,510 | B2 | 10/2022 | Tajik et al. | |
| 2006/0104458 | A1 * | 5/2006 | Kenoyer | H04R 3/005 381/92 |
| 2015/0131966 | A1 * | 5/2015 | Zurek | H04S 3/008 386/241 |
| 2016/0088417 | A1 * | 3/2016 | Kim | H04S 1/005 381/17 |
| 2016/0140396 | A1 * | 5/2016 | Feng | G06T 7/20 348/14.08 |
| 2017/0078818 | A1 | 3/2017 | Habets et al. | |
| 2017/0277257 | A1 | 9/2017 | Ota et al. | |
| 2018/0020312 | A1 | 1/2018 | Visser et al. | |
| 2018/0046874 | A1 * | 2/2018 | Guo | G06V 10/507 |
| 2018/0288518 | A1 * | 10/2018 | Schmidt | H04R 3/14 |
| 2018/0324542 | A1 * | 11/2018 | Seo | H04R 5/02 |
| 2019/0033446 | A1 * | 1/2019 | Bultan | G01S 15/66 |
| 2019/0058961 | A1 | 2/2019 | Lee | |
| 2019/0080517 | A1 * | 3/2019 | You | G06T 7/85 |
| 2019/0116448 | A1 * | 4/2019 | Schmidt | G06F 3/01 |
| 2020/0294293 | A1 * | 9/2020 | Boenig, II | G06T 11/60 |
| 2020/0387341 | A1 * | 12/2020 | Robinson | A61B 5/6803 |
| 2021/0097766 | A1 | 4/2021 | Palangie et al. | |
| 2021/0329405 | A1 | 10/2021 | Eubank et al. | |
| 2022/0007078 | A1 * | 1/2022 | Mate | G06Q 10/40 |
| 2022/0014868 | A1 * | 1/2022 | Binn | H04S 7/303 |
| 2022/0021972 | A1 * | 1/2022 | Brimijoin, II | G06T 19/006 |
| 2022/0021998 | A1 * | 1/2022 | Bae | H04S 5/005 |
| 2022/0022000 | A1 | 1/2022 | Bruhn et al. | |
| 2023/0214004 | A1 * | 7/2023 | Ishikawa | G06F 3/0484 345/156 |
| 2024/0236610 | A1 | 7/2024 | Eubank et al. | |

FOREIGN PATENT DOCUMENTS

| | | | |
|---|---|---|---|
| KR | 10-2017-0069790 | A | 6/2017 |
| KR | 10-2017-0118609 | A | 10/2017 |
| KR | 10-1870865 | B1 | 6/2018 |
| KR | 10-1963244 | B1 | 3/2019 |
| KR | 10-2020-0071099 | A | 6/2020 |
| KR | 10-2021-0131422 | A | 11/2021 |
| KR | 10-2398850 | B1 | 5/2022 |
| KR | 10-2586699 | B1 | 10/2023 |

OTHER PUBLICATIONS

Written Opinion dated Dec. 7, 2023, issued by the International Searching Authority in International Application No. PCT/KR2023/012442.

Communication dated Jul. 25, 2025 issued by the European Patent Office in European Patent Application No. 23868410.4.

* cited by examiner

ELECTRONIC DEVICE FOR CHANGING AUDIO SIGNAL BASED ON INFORMATION RELATED TO VISUAL OBJECT AND METHOD THEREOF

CROSS-REFERENCE TO RELATED APPLICATION(S)

This application is a continuation of International Application No. PCT/KR2023/012442, filed on Aug. 22, 2023, which claims priority to Korean Patent Application No. 10-2022-0120553, filed on Sep. 23, 2022, in the Korean Intellectual Property Office and Korean Patent Application No. 10-2022-0144819, filed on Nov. 2, 2022, in the Korean Intellectual Property Office, the disclosures of which are incorporated by reference herein their entirety.

BACKGROUND

1. Technical Field

The disclosure relates to a device and a method for adjusting an audio signal based on information related to a visual object.

2. Description of Related Art

To provide an enhanced user experience, an electronic device providing an augmented reality (AR) service displaying information generated by a computer in association with an external object in the real world, a virtual reality (VR) service for providing an immersive user experience for the virtual world and/or a mixed reality (MR) service are being developed. The electronic device may be an electronic device that may be worn by a user. For example, the electronic device may be AR glasses and/or a head-mounted device (HMD).

SUMMARY

According to an embodiment, an electronic device may comprise a display, a speaker, a microphone array in which a plurality of microphones are arranged, and a processor. The processor may be configured to receive acoustic signals through the plurality of microphones of the microphone array, in a state displaying a visual object in the display. The processor may be configured to obtain first information related to propagated characteristics of the acoustic signals in a space where the microphone array is disposed, based on the received acoustic signals. The processor may be configured to change an audio signal corresponding to the visual object, based on the first information and second information for displaying the visual object in the display. The processor may be configured to output the changed audio signal, through the speaker.

According to an embodiment, a method of an electronic device may comprise receiving acoustic signals through a plurality of microphones of a microphone array, in a state displaying a visual object in display. The method of the electronic device may comprise obtaining first information related to propagated characteristics of the acoustic signals in a space where the microphone array is disposed, based on the received acoustic signals. The method of the electronic device may comprise changing an audio signal corresponding to the visual object, based on the first information and second information for displaying the visual object in the display. The method of the electronic device may comprise outputting the changed audio signal, through a speaker.

According to an embodiment, a computer readable storage medium storing one or more programs, the one or more programs may be, when executed by a processor of an electronic device, configured to receive acoustic signals through a plurality of microphones of a microphone array, in a state displaying a visual object in display. The one or more programs may be configured to, when executed by the processor of an electronic device, change an audio signal corresponding to the visual object, based on the first information and second information for displaying the visual object in the display. The one or more programs may be configured to, when executed by the processor of an electronic device, output the changed audio signal, through a speaker.

BRIEF DESCRIPTION OF THE DRAWINGS

FIG. 2 is an example block diagram of an electronic device, according to an

DETAILED DESCRIPTION

Hereinafter, example embodiments of the disclosure will be described with reference to the accompanying drawings.

Figure 1:
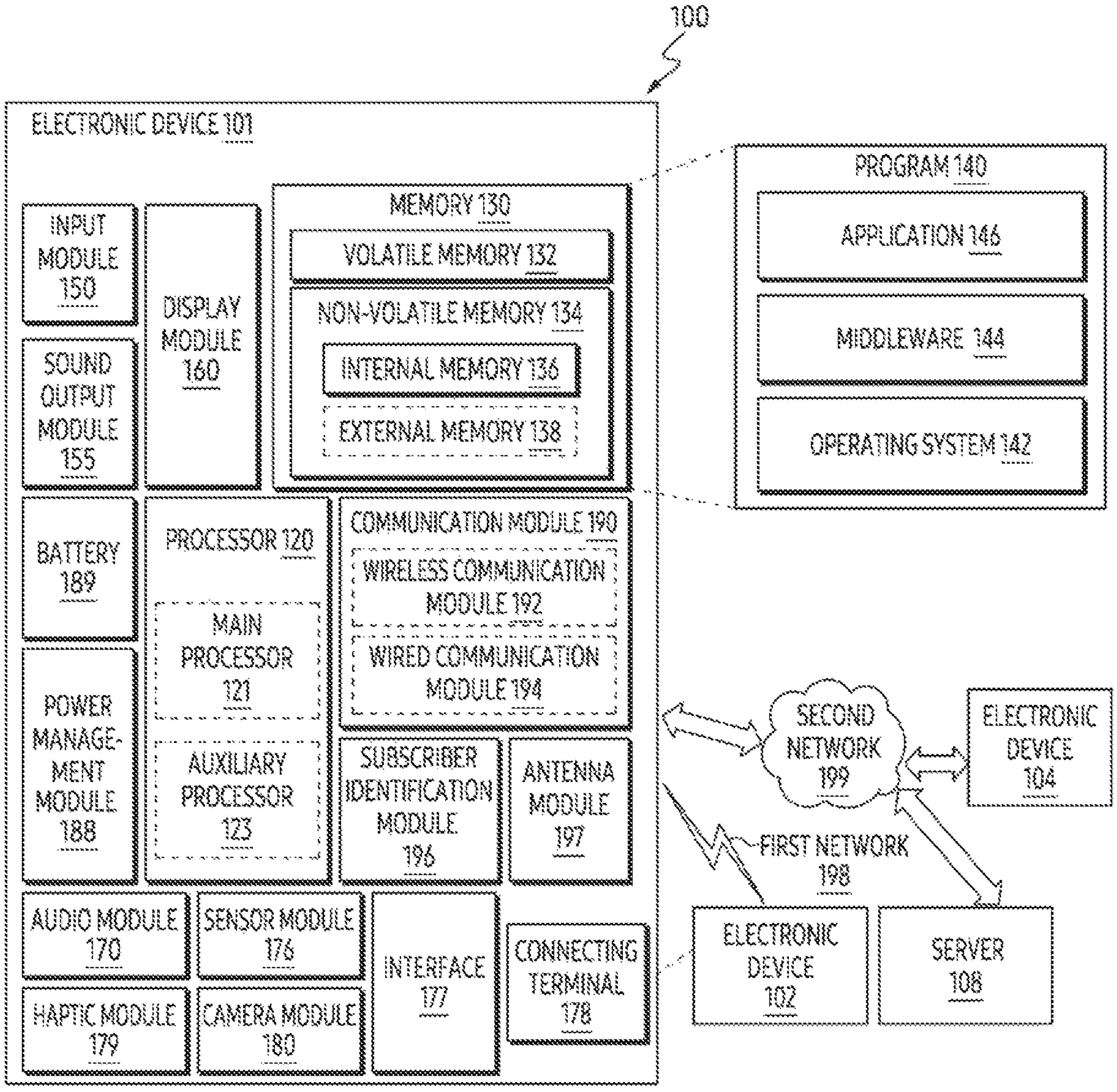
FIG. 1 is an example block diagram of an electronic device in a network environment, according to an embodiment. embodiment.

FIG. 1 is a block diagram illustrating an electronic device 101 in a network environment 100, according to one or more embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In one or more embodiments, at least one of the components (e.g., the connecting terminal 178) may be omitted from the electronic device 101, or one or more other components may be added in the electronic device 101. In one or more embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, phrases such as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
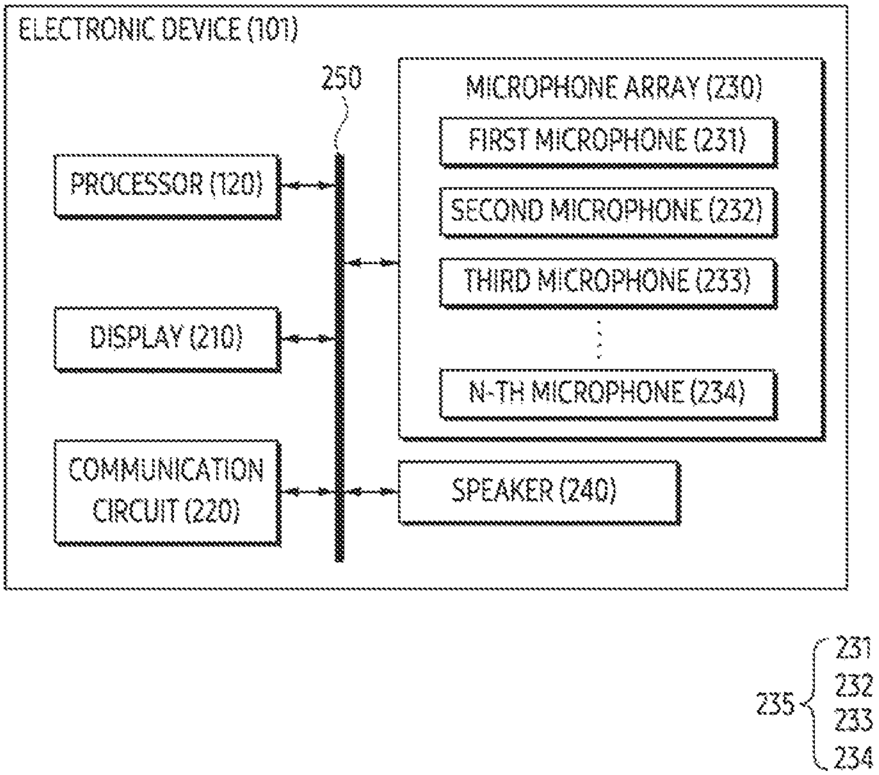

FIG. 2 is an example of a block diagram of an electronic device according to an embodiment. An electronic device 101 of FIG. 2 may be an example of the electronic device 101 of FIG. 1. A processor 120 of FIG. 2 may be an example of the processor 120 of FIG. 1. Operations of FIG. 2 may be executed by the processor 120 of FIGS. 1 and/or 2. The electronic device 101 according to an embodiment may have a shape of glasses wearable on a user's body part (e.g., head). The electronic device 101 of FIG. 2 may include a head-mounted display (HMD). For example, a housing of the electronic device 101 may include a flexible material such as rubber and/or silicon having a shape that closely adheres to a part of a user's head (e.g., a part of the face surrounding both eyes). For example, the housing of the electronic device 101 may include one or more straps able to be twined around a user's head, and/or one or more temples attachable to an ear of the head.

Referring to FIG. 2, the electronic device 101 according to an embodiment may include at least one of a processor 120, a display 210, a communication circuit 220, a microphone array 230, and a speaker 240. The processor 120, the display 210, the communication circuit 220, the microphone array 230, and the speaker 240 may be electronically and/or operably coupled with each other by a communication bus 250. That the hardware is operably coupled may mean that a direct connection or indirect connection between the hardware is established by wire or wirelessly so that specific hardware among the hardware is controlled by other hardware, and/or the other hardware is controlled by the specific hardware. The type and/or number of hardware included in the electronic device 101 is not limited to an example of FIG. 2.

According to an embodiment, the processor 120 of the electronic device 101 may include a hardware component for processing data based on one or more instructions. The hardware component for processing data may include, for example, an arithmetic and logic unit (ALU), a floating point unit (FPU), a field programmable gate array (FPGA), and/or a central processing unit (CPU). The number of processors 120 may be one or more. For example, the processor 120 may have a structure of a multi-core processor such as a dual core, a quad core, or a hexa core. The processor 120 of FIG. 2 may include the processor 120 of FIG. 1.

Within a memory (e.g., the memory 130 of FIG. 1), one or more instructions representing a calculation and/or an operation that the processor 120 will perform on data may be stored. A set of one or more instructions may be referred to as a firmware, an operating system, a process, a routine, a sub-routine, and/or an application. For example, the electronic device 101 and/or the processor 120 may perform an operation of FIG. 6 when a set of a plurality of instructions distributed in a form of the operating system, firmware, driver, and/or application is executed. Hereinafter, that an application is installed in the electronic device 101 means that one or more instructions provided in a form of an application are stored in the memory of the electronic device 101, and it may mean that the one or more applications are stored in a format (e.g., a file with an extension specified by the operating system of the electronic device 101) executable by the processor 120 of the electronic device 101.

According to an embodiment, a display 210 of the electronic device 101 may be controlled by the processor 120 and may display visualized information to a user. The number of displays 210 included in the electronic device 101 may be one or more. For example, the display 210 may be controlled by the processor 120 and/or a graphic processing unit (GPU), and may output visualized information to the user. The display 210 may include a flat panel display (FPD) and/or electronic paper. For example, the FPD may include a liquid crystal display (LCD), a plasma display panel (PDP), a digital mirror device (DMD), one or more light emitting diodes (LEDs), and/or a micro LED. The LED may include an organic LED (OLED). In an embodiment in which the display 210 includes an LCD, the display 210 may include a light source (e.g., a backlight) for emitting light toward the LCD. The light source may be omitted in an embodiment in which the display 210 includes an OLED. For example, the display 210 may include a panel and at least one display driver integrated circuit (DDI). For example, in case that the panel includes a plurality of LEDs arranged in a two-dimensional matrix, the DDI may control at least one LED included in a corresponding row or column among the plurality of LEDs. For example, controlling the at least one LED by the DDI may include an operation of adjusting the luminance and/or brightness of the LEDs.

According to an embodiment, in at least a portion of the display 210, light transmission may occur. For example, the electronic device 101 may provide a user experience related to augmented reality by providing a combination of light output through the display 210 and light transmitted through the display 210 to the user. An example of a structure of the electronic device 101 for providing the user experience related to augmented reality will be described with reference to FIGS. 7A to 7B. According to an embodiment, the electronic device 101 may have a structure in which the display 210 overlaps an entire field-of-view (FoV) of a user while being worn on a user's body part, such as the head. The display 210 may block ambient light of the electronic device 101 from being transmitted to the eyes of the user within the above state. For example, the electronic device 101 may provide a user experience related to virtual reality using the display 210 to the user. An example of the structure of the electronic device 101 for providing the user experience related to the virtual reality will be described with reference to FIGS. 8A to 8B.

According to an embodiment, the electronic device 101 may display the visual object based on information for displaying the visual object within the display 210. For example, the electronic device 101 may identify a position representing the visual object. For example, the electronic device 101 may identify a position representing the visual object based on a microphone array 230. For example, the electronic device 101 may form a beam using a plurality of microphones 235 included in the microphone array 230. The electronic device 101 may identify a position representing a visual object based on forming the beam. For example, the electronic device 101 may obtain information on the position representing the visual object. For example, information on the position representing the visual object may include information on the distance between the electronic device 101 and the visual object. For example, information on the position representing the visual object may include information on an angle between the electronic device 101 and the visual object. The electronic device 101 may change an audio signal corresponding to the visual object based on the information on the position representing the visual object. The electronic device 101 may output the changed audio signal through a speaker 240.

According to an embodiment, a communication circuit 220 of the electronic device 101 may include a hardware component for supporting transmission and/or reception of electrical signals (or data) between the electronic device 101 and an external electronic device. For example, the communication circuit 220 may include at least one of a MODEM, an antenna, and an optic/electronic (O/E) converter. The communication circuit 220 may support transmission and/or reception of electrical signals (or data) based on various types of protocols such as Ethernet, local area network (LAN), wide area network (WAN), wireless fidelity (WiFi), Bluetooth, Bluetooth low energy (BLE), Zigbee, long term evolution (LTE), and/or 5G new radio (NR) and other transmission types. According to an embodiment, an operation performed by the electronic device 101 based on communication between the external electronic device and the electronic device 101 will be described with reference to FIG. 3.

According to an embodiment, the electronic device 101 may display a virtual object (or a visual object) in the display 210 based on data transmitted from an external electronic device through the communication circuit 220. The electronic device 101 may obtain information related to the virtual object while displaying the virtual object on the display 210 based on data transmitted from the external electronic device. For example, the information related to the virtual object may include information on a position of the virtual object. According to an embodiment, the electronic device 101 may change an audio signal corresponding to the virtual object based on information on the position of the virtual object. The electronic device 101 may output the audio signal through a speaker 240 based on changing the audio signal corresponding to the virtual object. For example, the electronic device 101 may obtain information related to the virtual object and the audio signal corresponding to the virtual object through the communication circuit 220. For example, the electronic device 101 may obtain the audio signal corresponding to the virtual object as a second audio signal different from a first audio signal that is the signal, based on the application executed by the processor 120. The electronic device 101 may identify a delay between the first audio signal and the second audio signal in a state in which the second audio signal is acquired. For example, the electronic device 101 may adjust a time point at which at least one of the first audio signal or the second audio signal is reproduced based on the delay. For example, a delay between the first audio signal and the second audio signal may be referred to as a ping rate. For example, the ping rate may mean a delay in which data transmitted from an external electronic device is transmitted to the electronic device 101. For example, the electronic device 101 may synchronize a first audio signal and a second audio signal based on identifying the delay related to the ping rate. For example, synchronizing the first audio signal and the second audio signal may include adjusting a timing of outputting at least one of the first audio signal and the second audio signal. For example, the electronic device may adjust a time point at which at least one of the first audio signal or the second audio signal is reproduced based on the delay.

According to an embodiment, a microphone array 230 of the electronic device 101 may output an electrical signal indicating vibration of the atmosphere. The microphone array 230 may obtain an acoustic signal. The microphone array 230 included in the electronic device 101 may include a plurality of microphones 235. For example, the microphone array 230 may include a plurality of microphones 235, such as a first microphone 231, a second microphone 232, a third microphone 233, and/or an nth microphone 234. The number of the first microphone 231 to the nth microphone 234 is not limited. The first microphone 231 to the nth microphone 234 may be arranged at designated intervals. For example, the electronic device 101 may compare amplitudes of the acoustic signals received through each of the plurality of microphones 235, based on a distance interval between the plurality of microphones 235. For example, the electronic device 101 may obtain azimuth angles based on comparing amplitudes of the acoustic signals received through each of the plurality of microphones 235. The electrical signal output from the microphone array 230 may be transmitted to the processor 120. The processor 120 may obtain an audio signal for reconstructing the vibration using the speaker 240 from the electrical signal. For example, the processor 120 may acquire an audio signal based on acoustic signals. The processor 120 may output the audio signal through the speaker 240. An operation performed by the electronic device 101 based on obtaining the azimuth angles will be described with reference to FIG. 5.

According to an embodiment, the electronic device 101 may obtain acoustic signals based on the plurality of microphones 235. For example, the electronic device 101 may obtain information related to a propagated characteristic of the acoustic signals within a space where the electronic device 101 is disposed based on the acoustic signals obtained based on the plurality of microphones 235. For example, the electronic device 101 may identify a delay between the acoustic signals received through the plurality of microphones 235. The electronic device 101 may obtain the information related to the characteristics of propagating within the space where the electronic device 101 is disposed, based on identifying a delay between the acoustic signals received through each of the plurality of microphones 235. For example, the information may be related to a reverberation feature within the space. For example, the reverberation feature may be related to reverberation time. For example, the reverberation feature and/or the reverberation time may be related to a time when at least one of the acoustic signals is reduced by a designated amplitude (e.g., about 60 dB) from a time point at which at least one of the acoustic signals is obtained.

According to an embodiment, the electronic device 101 may obtain information on an acoustic signal through a microphone array 230. For example, the electronic device 101 may obtain the information based on obtaining the acoustic signal within a space where the microphone array 230 is disposed. The electronic device 101 may obtain information related to an impulse response by the space. For example, the impulse response may be related to a Fourier transform (FT). For example, the impulse response may be expressed as Equation 1 below.

$$y(t) = x(t) * h(t) = \int_{-\infty}^{\infty} x(\tau)h(t-\tau)d\tau \quad \text{[Equation 1]}$$

For example, the impulse response may be related to a reverberation feature. For example, the electronic device 101 may obtain the reverberation feature based on backward integration of result values obtained based on the impulse response. The electronic device 101 may change an audio signal based on the impulse response. The electronic device 101 may output the changed audio signal through the speaker 240.

According to an embodiment, the electronic device 101 may identify a level of acoustic signals received through the microphone array 230 and a level of an audio signal to output through the speaker 240. The electronic device 101 may identify a difference between the level of the acoustic signals and the level of the audio signal. The electronic device 101 may identify that the difference between the level of the acoustic signals and the level of the audio signal exceeds a designated level. In an embodiment, the electronic device 101 may output a second audio signal that is different from the audio signal which is a first audio signal and is for compensating the acoustic signals, within a state in which the difference between the level of the acoustic signals and the level of the audio signals exceeds a designated level. For example, the electronic device 101 may output the second audio signal having a second phase having a designated phase difference (e.g., about 180°) from a first phase of the acoustic signals to compensate for the acoustic signals. For example, when outputting the second audio signal, the electronic device 101 may output a second audio signal having a relatively lower intensity than the first audio signal.

The electronic device 101 may include other output means for outputting information in a form other than a visual form or an auditory form. For example, the electronic device 101 may include a motor for providing haptic feedback based on vibration. On the other hand, although shown based on different blocks, embodiments are not limited thereto, and some of the hardware components shown in FIG. 2 (e.g., at least a portion of the processor 120, the display 210, the communication circuit 220, the microphone array 230, and the speaker 240) may be included in a single integrated circuit such as a system on a chip (SoC).

As described above, according to an embodiment, the electronic device 101 may include one or more hardware for providing a user experience based on augmented reality (AR), mixed reality (MR), and/or virtual reality (VR).

As described above, according to an embodiment, the electronic device 101 may output an audio signal corresponding to a visual object. The electronic device 101 may change the audio signal based on information related to a position of the visual object. For example, the electronic device 101 may change (or adjust) and output an audio signal output through the speaker 240 based on the information related to the position of the visual object. The electronic device 101 may provide a sound effect corresponding to the position of the visual object by changing (or adjusting) and outputting the audio signal. The electronic device 101 may enhance the user experience of the electronic device 101 by providing the sound effect corresponding to the position of the visual object.

Figure 3:
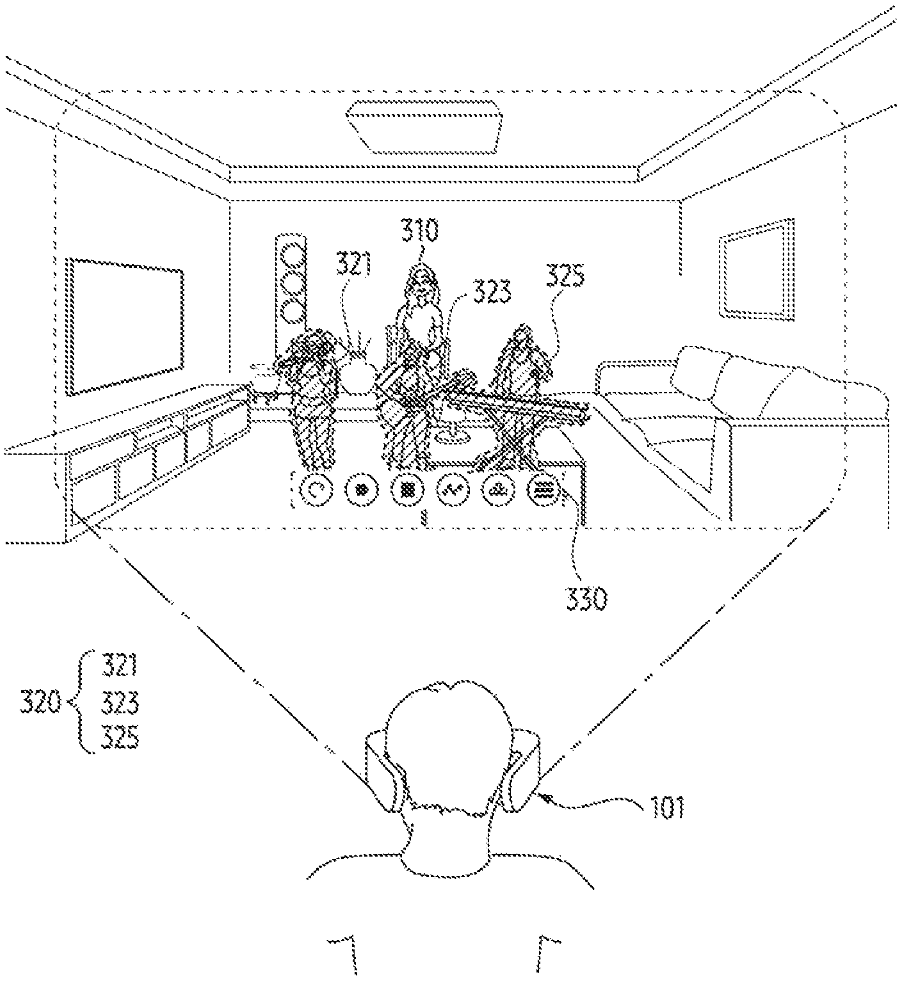
FIG. 3 is an example of a screen displayed in a display of an electronic device, according to an embodiment.

FIG. 3 is an example of a screen displayed in a display of an electronic device according to an embodiment. An electronic device of FIG. 3 may be an example of the electronic device 101 of FIGS. 1 to 2. Operations of FIG. 3 may be executed by the processor 120 of FIGS. 1 and/or 2.

Referring to FIG. 3, according to an embodiment, the electronic device 101 may display a screen through a display (e.g., the display 210 of FIG. 2). For example, the electronic device 101 may display a visual object (e.g., the external object, and/or virtual object) through the display. For example, the electronic device 101 may identify a first visual object 310. The first visual object 310 may be referred to as an external object 310. For example, the external object 310 may include a real object. For example, the electronic device 101 may identify a second visual object 320. For example, the second visual object 320 may include a virtual object 321, 323, and 325 generated based on information transmitted from an external electronic device through a communication circuit (e.g., the communication circuit 220 of FIG. 2). For example, the second visual object 320 may include a first virtual object 321, a second virtual object 323, and/or a third virtual object 325. For example, the second visual object 321 may include a virtual object displayed by the electronic device 101 through the display. Hereinafter, the visual object may include an external object and/or a virtual object.

According to an embodiment, the electronic device 101 may display a user interface (UI) 330 for controlling an audio signal related to the visual objects 310 and 320 while displaying the visual objects 310 and 320. For example, within the UI 330, the electronic device 101 may display buttons (e.g., play button, recording button, sharing button, or download button) for adjusting the audio signal of the visual objects 310 and 320. For example, the electronic device 101 may execute a function assigned to each of the buttons based on an input to each of the buttons.

According to an embodiment, the electronic device 101 may identify an acoustic signal generated by a visual object shown through the display. For example, based on a sound generated from the visual object, the electronic device 101 may receive an acoustic signal related to the sound through a plurality of microphones (e.g., the plurality of microphones 235 in FIG. 2) of a microphone array (e.g., the microphone array 230 in FIG. 2). For example, the electronic device 101 may identify an acoustic signal generated from the external object 310. The electronic device 101 may sample the acoustic signal based on obtaining of the acoustic signal. The electronic device 101 may obtain a first audio signal related to the external object 310 based on sampling of the acoustic signal. The electronic device 101 may identify an audio signal of the second visual object 320. Based on obtaining of the first audio signal and/or the second audio signal, the electronic device 101 may output the first audio signal and/or the second audio signal through the speaker of the electronic device 101 (e.g., the speaker 240 of FIG. 2). For example, the electronic device 101 may obtain an acoustic signal generated by the external object 310 based on a beam formed using a microphone array. The electronic device 101 may identify location information related to the first visual object 310 and/or the second visual object 320 based on the beam formed using the microphone array. For example, the location information may include information related to a distance between the electronic device 101 and a visual object. For example, the location information may include information related to an angle between the electronic device 101 and the visual object. The electronic device 101 may identify the distance between the visual object and the electronic device. The electronic device 101 may identify the angle between the visual object and the electronic device 101. The description related to the distance between the visual object and the electronic device 101 will be described later with respect to FIG. 5. The description related to the angle between the visual object and the electronic device 101 will be described later with respect to FIG. 5.

According to an embodiment, the electronic device 101 may obtain an acoustic signal from the external object 310. The electronic device 101 may obtain the first audio signal related to the external object 310 based on the acoustic signal obtained from the external object 310. For example, the electronic device 101 may obtain the first audio signal related to the external object 310 by sampling the acoustic signal. For example, the electronic device 101 may convert an acoustic signal, which is an analog signal, into a first audio signal, which is a digital signal. The electronic device 101 may obtain the first audio signal, which is a digital signal, from the acoustic signal by sampling the acoustic signal, which is the analog signal, at every designated timing. The external object 310 may be referred to as a first visual object represented through the display of the electronic device 101.

According to an embodiment, the electronic device 101 may display virtual objects 320 generated by the processor (e.g., the processor 120 of FIG. 1 and/or FIG. 2) through a display (e.g., the display 210 of FIG. 2). The virtual objects 320 may be referred to as a second visual object. The electronic device 101 may identify the second audio signal of the virtual objects 320. The electronic device 101 may identify a level of the second audio signal of the virtual objects 320. The electronic device 101 may identify a level of the first audio signal related to the external object 310. The electronic device 101 may identify a difference between the level of the second audio signals of the virtual objects 320 and the level of the first audio signal related to the external object 310. Based on the difference between the level of the first audio signal and the level of the second audio signals exceeding the designated threshold, the electronic device 101 may adjust at least one of the level of the first audio signal and the level of the second audio signal. Based on adjusting at least one of the level of the first audio signal and the level of the second audio signals, the electronic device 101 may output the first audio signals and/or the second audio signals having the adjusted signal.

According to an embodiment, the electronic device 101 may obtain an acoustic signal from the external object 310. Based on obtaining of the acoustic signal, the electronic device 101 may obtain first information related to a characteristic propagated in a space in which a microphone array (e.g., the microphone array 230 of FIG. 2) is disposed. For example, the first information may be obtained based on a plurality of microphones arranged in a microphone array. The first information may include information related to a space in which the electronic device 101 is disposed. For example, the first information may be obtained based on a timing when a plurality of microphones obtain the acoustic signal. The first information may include information related to reverberation time.

According to an embodiment, the electronic device 101 may obtain second information for displaying the virtual objects 320 in the display. For example, the second information may include information related to a location of the virtual objects 320 displayed through the display. For example, the second information may include information related to a distance between the electronic device 101 and the virtual objects 320. The second information may include information related to an angle between the electronic device 101 and the virtual objects 320. Based on the first information related to the space in which the electronic device 101 is disposed and the second information related to the location of the virtual objects 320, the electronic device 101 may change the first audio signal and/or the second audio signals corresponding to each of the external object 310 and the virtual objects 320. The electronic device 101 may output the changed first audio signal and/or second audio signals. Hereinafter, the first audio signal and/or the second audio signals may be referred to as an audio signal. For example, the electronic device 101 may change the audio signal by changing equalizer information of the audio signal. For example, the equalizer information may include a plurality of parameters (e.g., the frequency gain) corresponding to different frequency bands. Based on a frequency characteristic indicated by the plurality of parameters, the electronic device 101 may change the audio signal to be outputted through the speaker. For example, the electronic device 101 may mix the acoustic signal and the audio signal. The electronic device 101 may output an audio signal reflecting the first information related to the space in which the electronic device 101 is disposed, based on mixing the acoustic signal and the audio signal. For example, the electronic device 101 may output an audio signal with a virtual surround effect based on mixing the audio signal.

According to an embodiment, the electronic device 101 may identify a level of the second audio signal of the first visual object 310 and the virtual objects 320. The electronic device 101 may identify that a difference between the level of the first audio and the level of the second audio signal exceeds a designated level. For example, in a state where a difference between a level of the external first audio signal and a level of the second audio signal exceeds the designated level, the electronic device 101 may adjust at least one of the first audio signal and the second audio signal. The electronic device 101 may output the first audio signal with an adjusted level and/or the second audio signal with an adjusted level. For example, the audio signal (e.g., the first audio signal with the adjusted level, and/or the second audio signal with the adjusted level) with the adjusted level may have a second phase having a designated phase difference from a first phase of acoustic signals obtained from the external object 310. For example, the third audio signal may be a signal of a relatively smaller intensity than the first audio signal and/or the second audio signals. For example, the third audio signal may be an audio signal in which the level of the first audio signal is adjusted. For example, the third audio signal may be an audio signal in which the level of the second audio signal is adjusted.

As described above, according to an embodiment, the electronic device 101 may mix the first audio signal obtained based on the acoustic signal of the actual external object 310 and the second audio signal related to the virtual object (e.g., the virtual objects 320). Based on mixing the first audio signal and the second audio signal, the electronic device 101 may obtain a third audio signal related to information in a space where the electronic device 101 is disposed. The electronic device 101 may output the third audio signal related to the information in the space where the electronic device 101 is disposed. The electronic device 101 may enhance the user experience of the electronic device 101 by outputting the third audio signal.

As described above, according to an embodiment, the electronic device 101 may obtain the first audio signal based on obtaining acoustic signals. For example, the electronic device 101 may obtain the first audio signal based on sampling the acoustic signal obtained from the external object 310. The electronic device 101 may obtain the second audio signal of the virtual object 320. The electronic device 101 may identify that the difference between the level of the first audio signal and the level of the second audio signal exceeds the designated level. In a state of identifying that the difference between the level of the first audio signal and the level of the second audio signal exceeding the designated level, the electronic device 101 may adjust at least one of the first audio signal and the second audio signal. For example, the electronic device 101 may obtain an adjusted second audio signal of a second phase having a designated phase difference from the first phase of the acoustic signals in the state. The electronic device 101 may output the adjusted second audio signal of the second phase through the speaker. The electronic device 101 may enhance the user experience of the electronic device 101 by outputting the adjusted second audio signal.

Figure 4A:
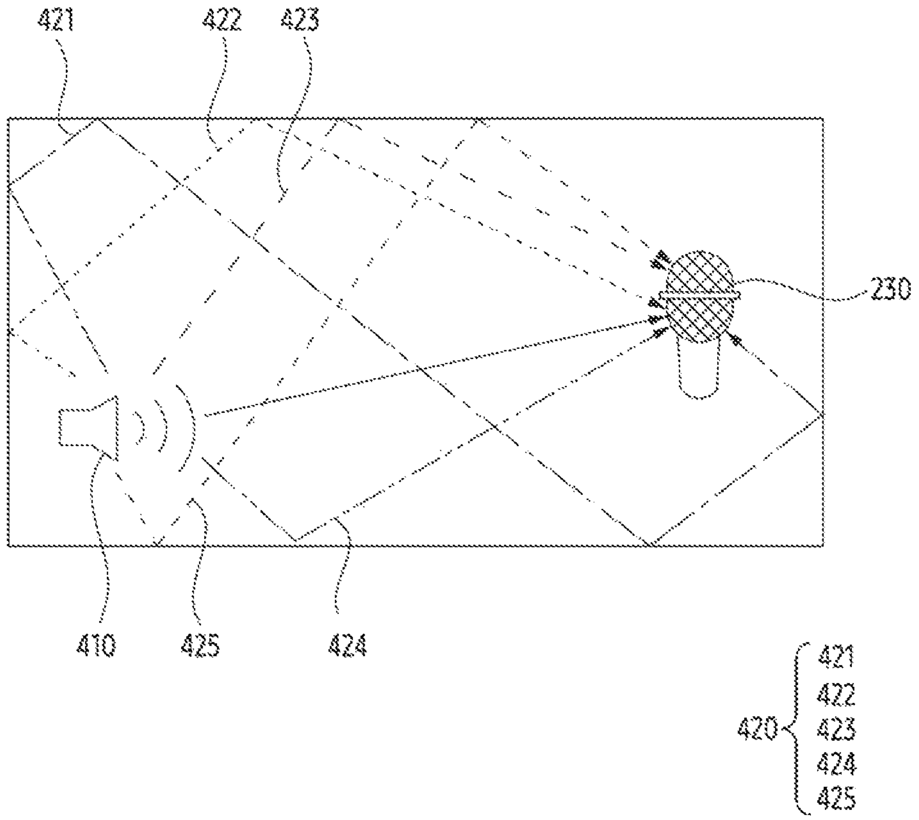
FIG. 4A is an example of an electronic device for identifying delays of acoustic signals, according to an embodiment.
Figure 4B:
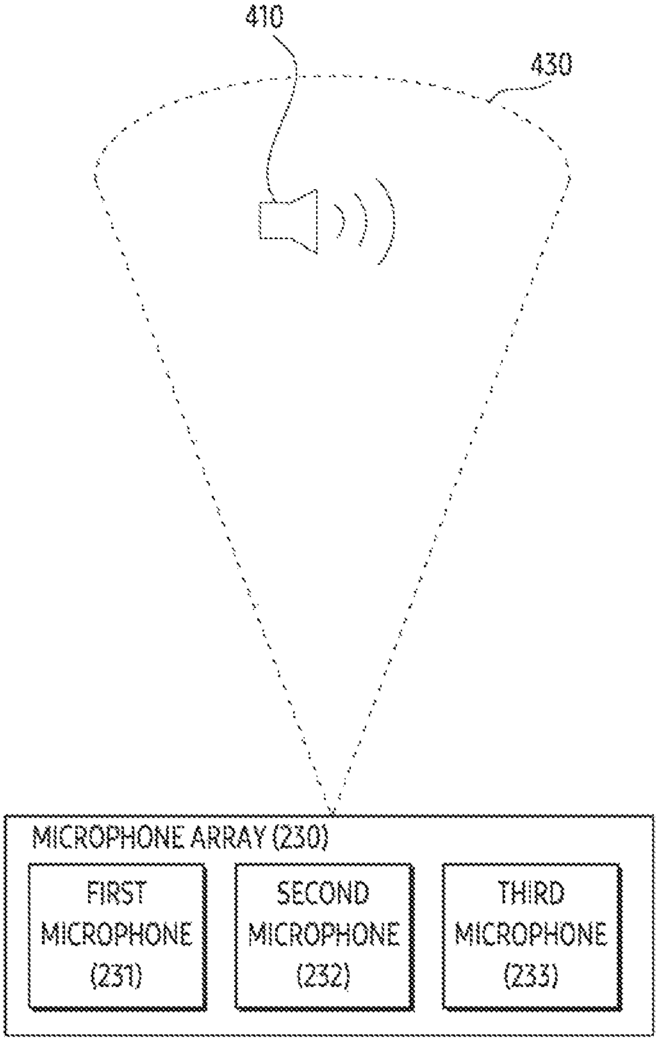
FIG. 4B is an example of a microphone array of an electronic device forming a beam, according to an embodiment.

FIG. 4A is an example of an electronic device for identifying delays of acoustic signals, according to an embodiment. FIG. 4B is an example of a microphone array of an electronic device forming a beam, according to an embodiment. The electronic device of FIG. 4A, and/or FIG. 4B may be an example of the electronic device 101 of FIGS. 1 and 2 and/or the electronic device of FIG. 3. Operations of FIG. 4A and/or FIG. 4B may be executed by the processor of FIG. 1 and/or FIG. 2. The microphone array 230 of the electronic device may include a plurality of microphones (e.g., the plurality of microphones 235 of FIG. 2).

Referring to FIG. 4A, according to an embodiment, the electronic device may obtain acoustic signals 420 generated from a visual object 410 through a plurality of microphones disposed in the microphone array 230 (e.g., the plurality of microphones 235 in FIG. 2). For example, based on obtaining the acoustic signals 420 through the microphone array 230, the electronic device may obtain first information related to a characteristic propagated in a space where the microphone array 230 is disposed. For example, the electronic device may identify a delay in which the acoustic signals 420 generated from the visual object 410 are received by the electronic device. For example, the electronic device may receive a first acoustic signal 421, a second acoustic signal 422, a third acoustic signal 423, a fourth acoustic signal 424, and/or a fifth acoustic signal 425 generated from the visual object 410. The number of the acoustic signals 420 is not limited. The electronic device may identify a timing when each of the acoustic signals 420 is received.

According to an embodiment, the electronic device may identify the first information related to the characteristic propagated in the space based on identifying the timing when each of the acoustic signals 420 is received. For example, the characteristic propagated in the space may be related to reverberation time. For example, the reverberation time may refer to a time when amplitude of sound generated in the space is reduced by a designated amplitude (e.g., about 60 dB). For example, the electronic device may obtain the first information based on the timing when each of the acoustic signals 420 is received and the amplitude of each of the acoustic signals 420. For example, the electronic device may identify the delay of each of the acoustic signals 420 based on the timing when each of the acoustic signals 420 is received. The electronic device may obtain the first information based on the delay of each of the acoustic signals 420. The electronic device may change an audio signal based on the first information. The electronic device may output the changed audio signal through a speaker (e.g., the speaker 240 of FIG. 2).

As described above, according to an embodiment, the electronic device may obtain the acoustic signals 420. The electronic device may identify a timing when each of the acoustic signals 420 is received through the microphone array 230. Based on the received timing and the amplitude of the acoustic signals 420, the electronic device may obtain the first information related to the characteristic propagated in the space where the electronic device is disposed. Based on obtaining the first information, the electronic device may modulate the acoustic signals 420 into audio signals. The electronic device may output the audio signal through a speaker. The electronic device may enhance the user experience of the electronic device by outputting the modulated audio signal.

Referring to FIG. 4B, the electronic device 101 may include a plurality of microphones 231, 232, and 233 included in the microphone array 230. The number of the plurality of microphones is not limited, as described above. The electronic device 101 may form a beam 430 based on the plurality of microphones 231, 232, and 233. The beam 430 may be formed by using the microphone array 230 and/or the plurality of microphones 231, 232, and 233. The electronic device 101 may obtain an acoustic signal included in the beam 430 based on forming the beam 430. Forming the beam 430 may include pointing the beam 430 to the visual object 410. The electronic device 101 may selectively obtain an acoustic signal included in the beam 430 based on the beam 430. The electronic device 101 may obtain the first audio signal by sampling the acoustic signal based on selectively obtaining the acoustic signal. Forming the beam 430 may be referred to as beamforming. For example, the beamforming may include fixed beamforming and adaptive beamforming.

According to an embodiment, the electronic device 101 may obtain an acoustic signal of the pointed visual object 410 based on forming the beam 430. The electronic device 101 may sample the acoustic signal based on obtaining the acoustic signal. The electronic device 101 may obtain the first audio signal based on sampling the acoustic signal. The electronic device 101 may identify a level of the second audio signal obtained from the virtual object (e.g., the virtual objects 320 of FIG. 3) and a level of the first audio signal based on obtaining the first audio signal. The electronic device 101 may identify that a difference between the level of the first audio signal and the level of the second audio signal exceeds the designated threshold. The electronic device 101 may adjust at least one of the level of the first audio signal and the level of the second audio signal based on identifying that exceeding the designated threshold. The electronic device 101 may enhance the user experience of the electronic device 101 by adjusting the level of the first audio signal and the level of the second audio signal.

Figure 5:
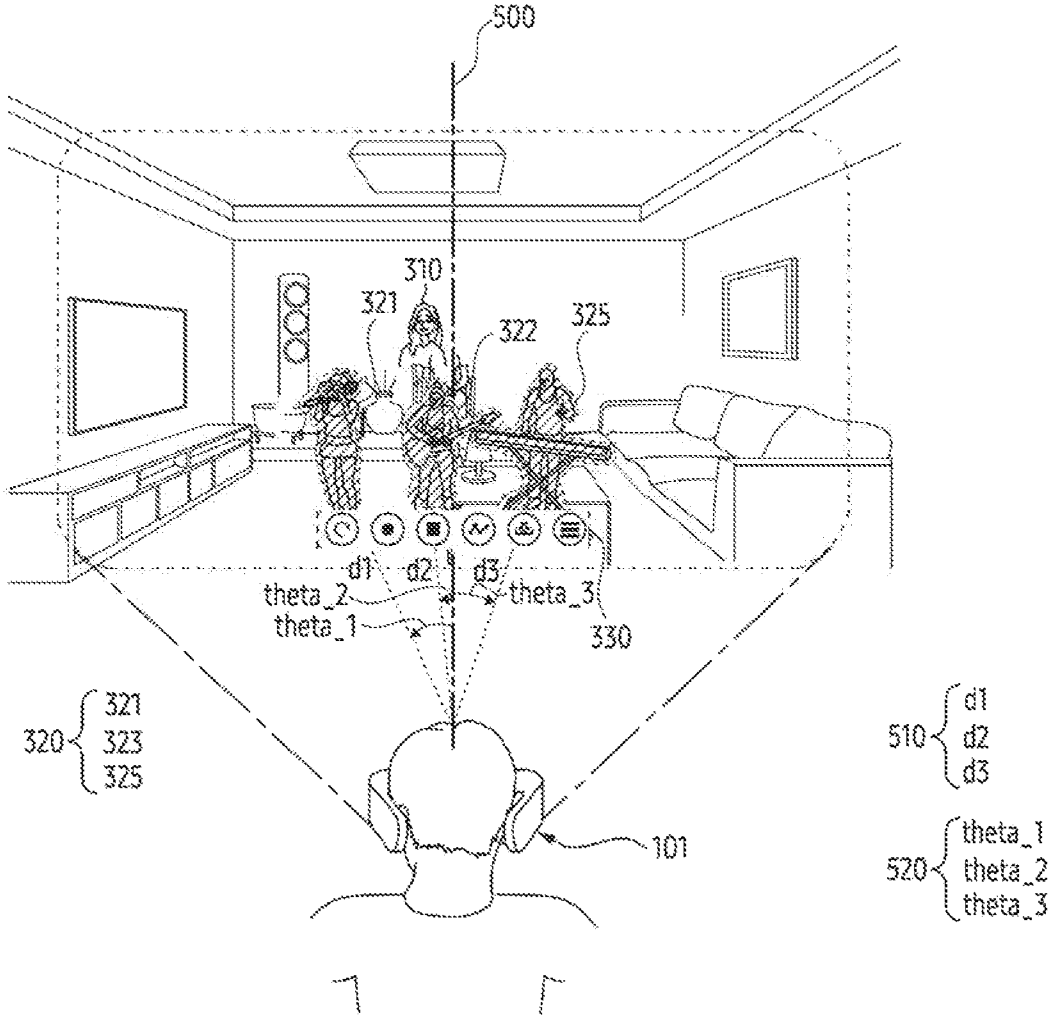
FIG. 5 is an example of an electronic device obtaining azimuth angles of visual objects, according to an embodiment.

FIG. 5 is an example of an electronic device obtaining azimuth angles of visual objects, according to an embodiment. The electronic device 101 of FIG. 5 may be an example of the electronic device 101 of FIGS. 1 to 2 and/or the electronic device of FIGS. 3 to 4B. Operations of FIG. 5 may be executed by the processor 120 of FIGS. 1 and/or 2.

Referring to FIG. 5, according to an embodiment, the electronic device 101 may display the visual object 310 generated based on the external object through a display (e.g., the display 210 in FIG. 2). The electronic device 101 may display the visual objects 320 matching each of virtual objects generated based on data received from the external electronic device through a communication circuit (e.g., the communication circuit 220 of FIG. 2) through the display. Hereinafter, the visual object 310 generated based on the external object and/or the visual objects 320 matching the virtual object may be described as a visual object.

According to an embodiment, the electronic device 101 may display a first visual object 321 matching a first virtual object, a second visual object 323 matching a second virtual object, and/or a third visual object 325 matching a third virtual object through a display. For example, the electronic device 101 may obtain location information related to each of the visual objects 320. For example, the location information may include information related to a distance between the visual objects 320 and the electronic device 101. For example, the location information may include information related to an angle between the visual objects 320 and the electronic device 101.

For example, the electronic device 101 may obtain information related to a distance dl between the first visual object 321 and the electronic device 101. For example, the electronic device 101 may obtain an azimuth angle theta_1 between the first visual object 321 and the electronic device 101. For example, the azimuth angle may be an angle between a direction 500 in which one surface of the electronic device 101 viewing and a direction toward the first visual object 321. For example, the electronic device 101 may obtain information related to a distance d2 between the second visual object 323 and the electronic device 101. The electronic device 101 may obtain an azimuth angle theta_2 between the second visual object 323 and the electronic device 101. For example, the electronic device 101 may obtain information related to a distance d3 between the third visual object 325 and the electronic device 101. The electronic device 101 may obtain an azimuth angle theta_3 between the third visual object 325 and the electronic device 101. For example, the electronic device 101 may obtain azimuth angles 520 between the electronic device 101 and each of the visual objects 320. According to an embodiment, the electronic device 101 may change audio signals obtained from the visual objects 320 based on obtaining location information related to each of the visual objects 320. The electronic device 101 may change the audio signals to match location information related to each of the visual objects 320. For example, changing the audio signals may include adjusting equalizer of the audio signals. For example, the electronic device 101 may output audio signals based on information related to the space in which the electronic device 101 is disposed, by adjusting the equalizer of the audio signals.

Referring to FIG. 5, according to an embodiment, the electronic device 101 may identify a state in which the first visual object 321 is relatively identified on the left side. For example, the electronic device 101 may represent the azimuth angle theta_1 of the first visual object 321 based on a negative number in the state. Representing the azimuth angle theta_1 as a negative number is only for convenience of description and it is not limited thereto. The electronic device 101 may output an audio signal matching the first visual object 321 through a speaker of the electronic device 101. For example, through a speaker disposed on a surface of the electronic device 101, the electronic device 101 may output a relatively stronger audio signal than an audio signal outputted through a speaker disposed on another surface opposite to the surface.

According to an embodiment, the electronic device 101 may obtain information related to distances d1, d2, and d3 matched to each of the visual objects 320. For example, the electronic device 101 may adjust audio signals matched to each of the visual objects 320 based on information related to the distances d1, d2, and d3. For example, the electronic device 101 may relatively strongly output an audio signal matched to the second visual object 323 identified as a relatively close distance d2, compared to audio signals matched to the first visual object 321 and audio signals matched to the third visual object 325. For example, the electronic device 101 may highly designate a level of an audio signal matched to the second visual object 323 and output, compared to a level of an audio signal matched to the first visual object 321 and a level of an audio signal matched to the third visual object 325.

As described above, according to an embodiment, the electronic device 101 may adjust intensity of audio signals matched to the visual objects 320 based on information related to the location of the visual objects 320. For example, the information related to the location may include information on distances between each of the visual objects 320 and the electronic device 101. For example, the information related to the location may include information related to azimuth angles 520 between the electronic devices 101 and each of the visual objects 320. For example, adjusting the intensity of the audio signals may include adjusting the level of the audio signals. The electronic device 101 may enhance the user experience of the electronic device 101 by adjusting the levels of the audio signals.

Figure 6:
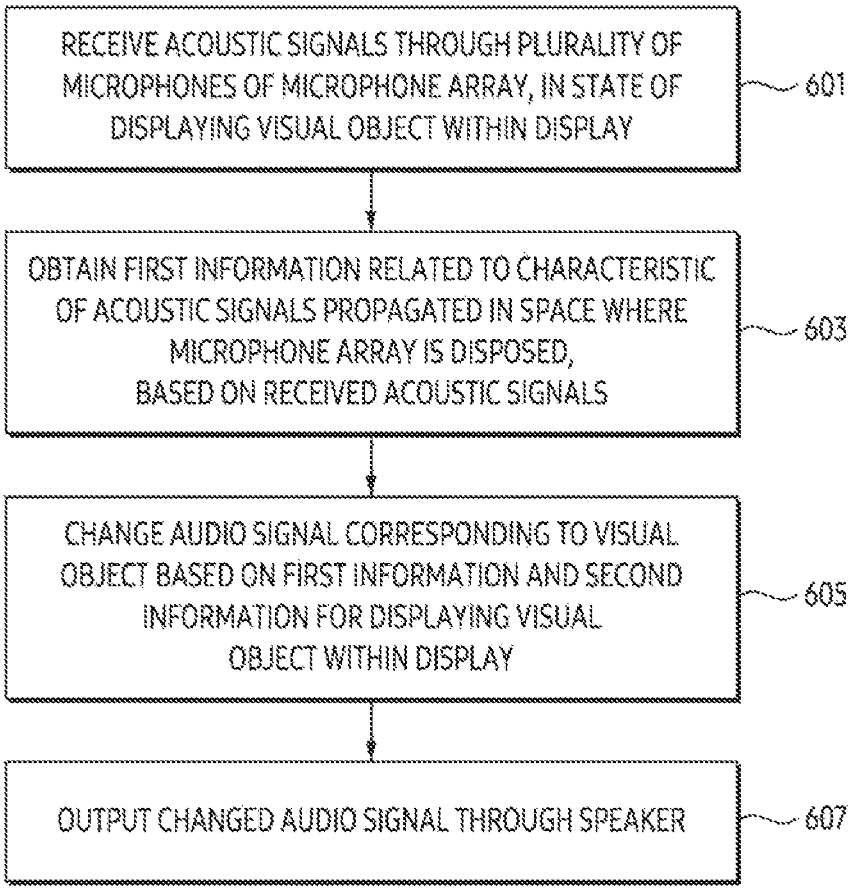
FIG. 6 is an example of a flowchart of an operation of an electronic device, according to an embodiment.

FIG. 6 is an example of a flowchart of an operation of an electronic device, according to an embodiment. The electronic device of FIG. 6 may be an example of the electronic device 101 of FIGS. 1 to 2 and/or 5 and the electronic device of FIG. 3 and/or 4B. Operations of FIG. 6 may be executed by the processor 120 of FIGS. 1 and/or 2.

Referring to FIG. 6, in operation 601, according to an embodiment, the electronic device may display a visual object (e.g., an external object, and/or a virtual object) within the display (e.g., the display 210 of FIG. 2). In a state of displaying the visual object within the display, the electronic device may receive acoustic signals through a plurality of microphones (e.g., the plurality of microphones 235 of FIG. 2) of a microphone array (e.g., the microphone array 230 of FIG. 2).

In operation 603, according to an embodiment, the electronic device may obtain first information related to a characteristic propagated in a space where a microphone array (e.g., the microphone array 230 in FIG. 2) is disposed, based on the received acoustic signals. For example, the first information may be related to an impulse response by the space to an acoustic signal. For example, the first information may be related to delays between acoustic signals received through each of a plurality of microphones. The electronic device may change the audio signal related to the acoustic signal based on the first information.

In operation 605, according to an embodiment, the electronic device may obtain the first information and second information for displaying a visual object in the display. For example, the second information may be related to a virtual object (e.g., the virtual objects 320 of FIG. 3) generated based on data transmitted from an external object (e.g., the external object 310 of FIG. 3) and/or an external electronic device. For example, the second information may include information related to the location of the visual object. For example, the information related to the location of the visual object may include information related to a distance between the electronic device and the visual object. For example, the information related to the location of the visual object may include information related to an azimuth angle between the electronic device and the visual objects. The electronic device may change an audio signal corresponding to the visual object based on the first information and the second information.

In operation 607, according to an embodiment, the electronic device may output the changed audio signal through a speaker (e.g., the speaker 240 of FIG. 2). For example, the electronic device may adjust the audio signal based on the first information and the second information. For example, the electronic device may obtain the second information based on a location where the visual object is displayed. For example, the electronic device may adjust a level of the audio signal outputted through a speaker included in the electronic device while outputting the audio signal based on the second information.

As described above, according to an embodiment, the electronic device may change the audio signal corresponding to the visual object based on the first information related to the characteristic propagated in the space and the second information for displaying the visual object. The electronic device may output the changed audio signal through a speaker. The electronic device may enhance the user experience of the electronic device by outputting the changed audio signal.

Figure 7A:
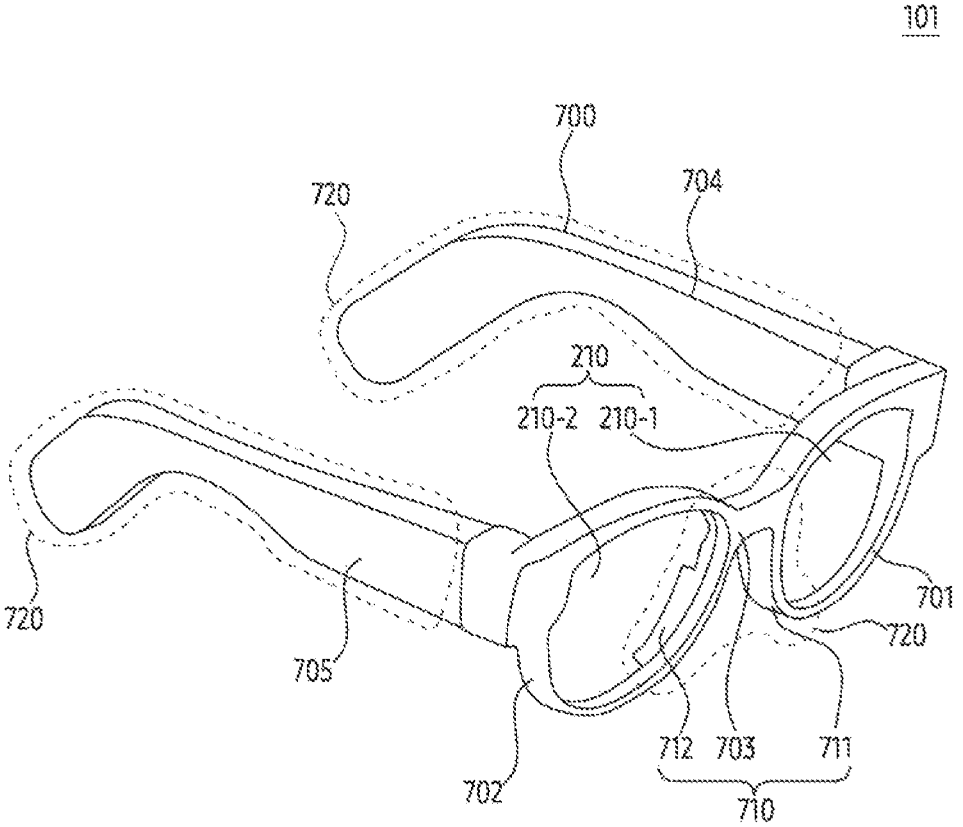
FIG. 7A illustrates an example of a perspective view of an electronic device, according to an embodiment.
Figure 7B:
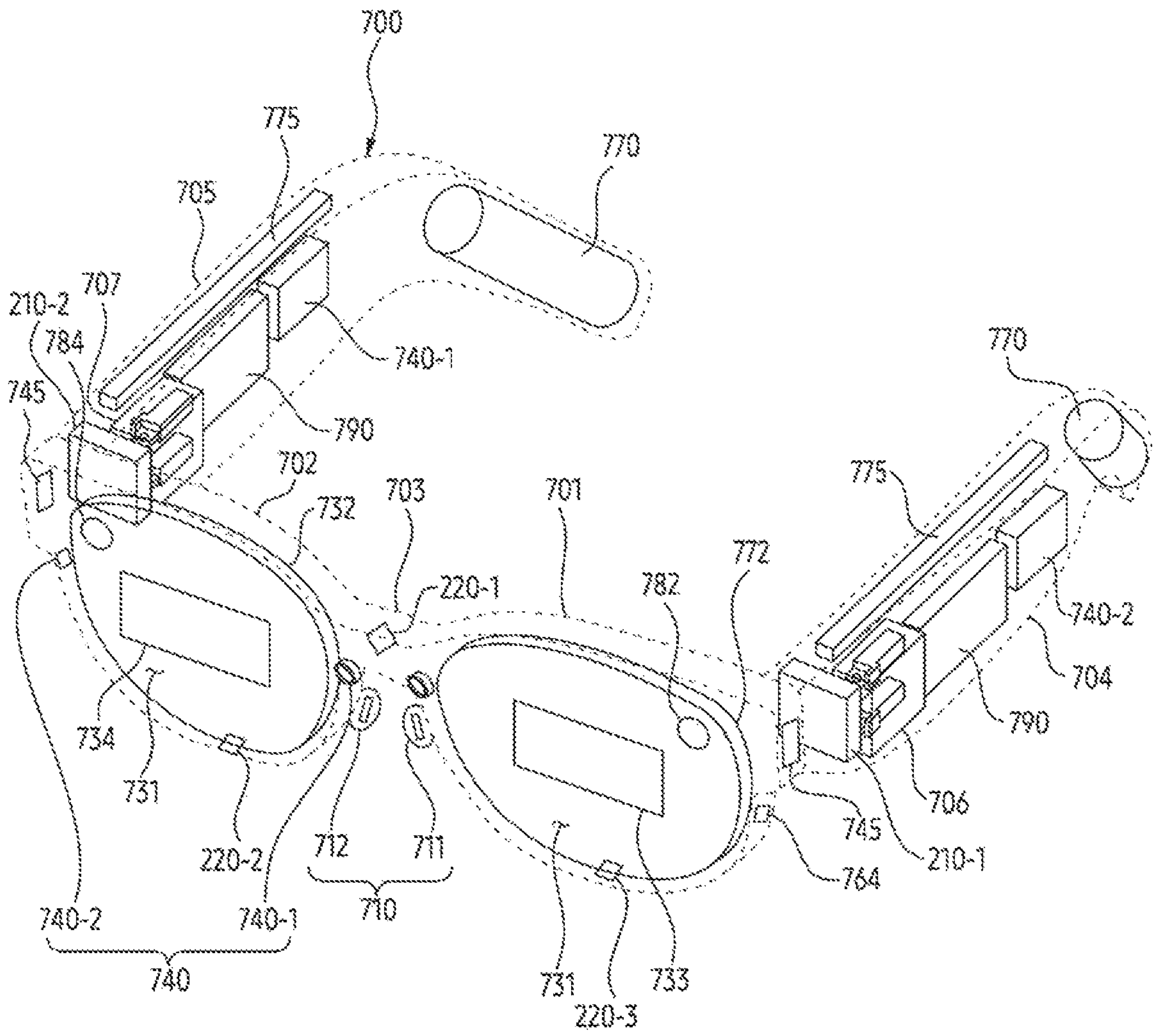
FIG. 7B illustrates an example of hardware provided in an electronic device, according to an embodiment.

FIG. 7A illustrates an example of a perspective view of an electronic device according to an embodiment. FIG. 7B illustrates an example of one or more hardware disposed in an electronic device according to an embodiment. The electronic device 101 of FIGS. 7A and 7B may be an example of the electronic device 101 of FIGS. 1, 2, 4B, and/or 6 and the electronic device of FIGS. 3, 4A, 5 and/or 6.

According to an embodiment, the electronic device 101 may be worn on a part of the user's body. The electronic device 101 may provide augmented reality (AR), virtual reality (VR), or mixed reality (MR) in which the AR and the VR are mixed to a user wearing the electronic device 101. For example, in response to the user's designated gesture obtained through a motion recognition camera 740-2 of FIG. 7B, the electronic device 101 may display a virtual reality image provided by at least one optical device 782 and 784 of FIG. 7B on the at least one display 210.

According to an embodiment, the at least one display 210 may provide visual information to a user. For example, the at least one display 210 may include a transparent or translucent lens. The at least one display 210 may include a first display 210-1 and/or a second display 210-2 spaced apart from the first display 210-1. For example, the first display 210-1 and the second display 210-2 may be disposed at positions corresponding to the user's left and right eyes, respectively.

Referring to FIG. 7B, the at least one display 210 may provide visual information transmitted from external light to the user through a lens included in the at least one display 210 and other visual information distinguished from the visual information. For example, the lens may be formed based on at least one of a fresnel lens, a pancake lens, or a multi-channel lens. For example, the at least one display 210 may include a first surface 731 and a second surface 732 opposite to the first surface 731. A displaying area may be formed on the second surface 732 of the at least one display 210. When the user wears the electronic device 101, external light may be transmitted to the user by entering the first surface 731 and passing through the second surface 732. For another example, the at least one display 210 may display an augmented reality image combined with a real screen transmitted through external light and a virtual reality image provided by at least one optical device 782 and 784, in the displaying area formed on the second surface 732.

In an embodiment, the at least one display 210 may include at least one waveguide 733 and 734 that diffracts light transmitted from the at least one optical device 782 and 784 and transmits it to the user. The at least one wave guide 733 and 734 may be formed based on at least one of glass, plastic, or polymer. A nano pattern may be formed on at least a part of the outside or inside of the at least one wave guide 733 and 734. The nano pattern may be formed based on a grating structure of a polygonal or curved shape. Light incident on one end of the at least one wave guide 733 and 734 may be propagated to another end of the at least one wave guide 733 and 734 by the nano pattern. The at least one wave guide 733 and 734 may include at least one of a diffraction element (e.g., diffractive optical element (DOE), holographic optical element (HOE)) and a reflection element (e.g., a reflection mirror). For example, the at least one wave guide 733 and 734 may be disposed in the electronic device 101 to guide a screen displayed by the at least one display 210 to the user's eyes. For example, the screen may be transmitted to the user's eyes based on total internal reflection (TIR) generated within the at least one wave guide 733 and 734.

The electronic device 101 may analyze an object included in the real image collected through a photographing camera (e.g., the camera 240 in FIG. 2) and identify a virtual object (e.g., the visual object 290 of FIG. 2) corresponding to an object to be provided with augmented reality among the analyzed objects, and display a combination of the real image and the identified virtual object on the at least one display 210. The virtual object may include at least one of text and images for various information related to the object included in the real image. The electronic device 101 may analyze an object based on a multi-camera such as a stereo camera. For the object analysis, the electronic device 101 may execute time-of-flight (ToF) and/or simultaneous localization and mapping (SLAM) supported by the multi-camera. A user wearing the electronic device 101 may view an image displayed on the at least one display 210.

According to an embodiment, the frame 700 may have a physical structure in which the electronic device 101 may be worn on the user's body. According to an embodiment, the frame 700 may be configured so that the first display 210-1 and the second display 210-2 may be positioned to correspond to the user's left and right eyes when the user wears the electronic device 101. The frame 700 may support the at least one display 210. For example, the frame 700 may support the first display 210-1 and the second display 210-2 to be positioned in positions corresponding to the user's left and right eyes.

Referring to FIG. 7A, when a user wears the electronic device 101, the frame 700 may include an area 720 in which at least a part is in contact with a part of the user's body. For example, the area 720 in contact with a part of the user's body of the frame 700 may include an area in contact with a part of the user's nose, a part of the user's ear, and a part of the side of the user's face that the electronic device 101 contacts. According to an embodiment, the frame 700 may include a nose pad 710 in contact with a part of the user's body. When the electronic device 101 is worn by the user, the nose pad 710 may contact a part of the user's nose. The frame 700 may include a first temple 704 and a second temple 705 in contact with another part of the user's body, which is distinguished from a part of the user's body.

For example, the frame 700 may include a first rim 701 surrounding at least a part of the first display 210-1, a second rim 702 surrounding at least a part of the second display 270-2, a bridge 703 disposed between the first rim 701 and the second rim 702, a first pad 711 disposed along a part of the edge of the first rim 701 from one end of the bridge 703, a second pad 712 disposed along a part of the edge of the second rim 702 from another end of the bridge 703, a first temple 704 extending from the first rim 701 and fixed to a part of the wearer's ear, and a second temple 705 extending from the second rim 702 and fixed to a part of an ear opposite to the ear. The first pad 711 and the second pad 712 may be in contact with a part of the user's nose, and the first temple 704 and the second temple 705 may be in contact with a part of the user's face and a part of the ear. The temple 704 and the temple 705 may be rotatably connected to a rim through hinge units 706 and 707 of FIG. 7B. The first temple 704 may be rotatably connected to the first rim 701 through the first hinge unit 706 disposed between the first rim 701 and the first temple 704. The second temple 705 may be rotatably connected to the second rim 702 through the second hinge unit 707 disposed between the second rim 702 and the second temple 705. According to an embodiment, the electronic device 101 may identify an external object (e.g., the user's fingertip) touching the frame 700 and/or a gesture performed by the external object, by using a touch sensor, a grip sensor, and/or a proximity sensor formed on at least a part of the surface of the frame 700.

According to an embodiment, the electronic device 101 may include hardware (e.g., hardware described above based on the block diagram of FIG. 2) performing various functions. For example, the hardware may include a battery module 770, an antenna module 775, at least one optical device 782 and 784, a speaker 240, a microphone array 230, a light emitting module, and/or a printed circuit board 790. Various hardware may be disposed in the frame 700.

According to an embodiment, the microphone array 230 of the electronic device 101 may be disposed on at least a part of the frame 700 to obtain an acoustic signal. For example, the microphone array 230 may include a first microphone 231, a second microphone 232, or a third microphone 233. The first microphone 231 disposed on the nose pad 710, the second microphone 232 disposed on the second rim 702, and the third microphone 233 disposed on the first rim 701 are illustrated in FIG. 7B, but the number and arrangement of microphones are not limited to an embodiment of FIG. 7B. When the number of microphones included in the electronic device 101 is more than one, the electronic device 101 may identify a direction of the acoustic signal by using a plurality of microphones disposed on different parts of the frame 700.

According to an embodiment, at least one optical device 782 and 784 may project a virtual object on the at least one display 210 to provide various image information to the user. For example, the at least one optical device 782 and 784 may be a projector. The at least one optical device 782 and 784 may be disposed adjacent to the at least one display 210 or may be included in the at least one display 210 as a part of the at least one display 210. According to an embodiment, the electronic device 101 may include a first optical device 782 corresponding to the first display 210-1 and a second optical device 784 corresponding to the second display 210-2. For example, the at least one optical device 782 and 784 may include the first optical device 782 disposed at the edge of the first display 210-1 and the second optical device 784 disposed at the edge of the second display 210-2. The first optical device 782 may transmit light to the first wave guide 733 disposed on the first display 210-1, and the second optical device 784 may transmit light to the second wave guide 734 disposed on the second display 210-2.

In an embodiment, the camera 740 may include a photographing camera, an eye tracking camera (ET CAM) 740-1, and/or a motion recognition camera 740-2. The photographing camera, the eye tracking camera 740-1, and the motion recognition camera 740-2 may be disposed in different positions on the frame 700 and perform different functions. The eye tracking camera 740-1 may output data indicating a gaze of the user wearing the electronic device 101. For example, the electronic device 101 may detect the gaze from an image including the user's eyes obtained through the eye tracking camera 740-1. An example in which the eye tracking camera 740-1 is disposed toward the user's right eye is illustrated in FIG. 7B, but embodiments are not limited thereto, and the eye tracking camera 740-1 may be disposed alone toward the user's left eye or may be disposed toward both eyes.

In an embodiment, the photographing camera may photograph an actual image or background to be matched with a virtual image to implement augmented reality or mixed reality content. The photographing camera may take an image of a specific object existing at a position viewed by the user and provide the image to the at least one display 210. The at least one display 210 may display one image in which information on the actual image or background including the image of the specific object obtained using the photographing camera and a virtual image provided through the at least one optical device 782 and 784 are overlapped. In an embodiment, the photographing camera may be disposed on the bridge 703 disposed between the first rim 701 and the second rim 702.

By tracking the gaze of the user wearing the electronic device 101, the eye tracking camera 740-1 may implement a more realistic augmented reality by matching the user's gaze with the visual information provided to the at least one display 210. For example, when the user faces the front, the electronic device 101 may naturally display environmental information related to the user's front in a place where the user is located on the at least one display 210. The eye tracking camera 740-1 may be configured to capture an image of the user's pupil to determine the user's gaze. For example, the eye tracking camera 740-1 may receive gaze detection light reflected from the user's pupil and track the user's gaze based on a location and a movement of the received gaze detection light. In an embodiment, the eye tracking camera 740-1 may be disposed at a position corresponding to the left and right eyes of the user. For example, the eye tracking camera 740-1 may be disposed in the first rim 701 and/or the second rim 702 to face a direction in which the user wearing the electronic device 101 is located. For example, a motion recognition camera 764 may be disposed in the second rim 702. For example, the motion recognition camera 764 may perform substantially the same operation as the motion recognition camera 740-2 included in the first rim 701.

The motion recognition camera 740-2 may provide a specific event to a screen provided on the at least one display 210 by recognizing a movement of the user's whole or part of body, such as the user's torso, hand, or face. The motion recognition camera 740-2 may obtain a signal corresponding to a motion by gesture recognition of the user and provide a display corresponding to the signal to the at least one display 210. The processor may identify a signal corresponding to the operation and perform a designated function based on the identification. In an embodiment, the motion recognition camera 740-2 may be disposed on the first rim 701 and/or the second rim 702.

The camera 740 included in the electronic device 101 is not limited to the eye tracking camera 740-1 and the motion recognition camera 740-2 described above. For example, by using the camera 740 disposed toward FoV of the user, the electronic device 101 may identify an external object included in the FoV. Identifying an external object by the electronic device 101 may be performed based on sensors to identify a distance between the electronic devices 101 and an external object, such as a depth sensor and/or a time of flight (ToF) sensor. The camera 740 disposed toward the FoV may support an autofocus function and/or an optical image stabilization (OIS) function. For example, the electronic device 101 may include the camera 740 (e.g., a face tracking (FT) camera) disposed toward the face to obtain an image including the face of a user wearing the electronic device 101.

According to an embodiment, the electronic device 101 may further include a light source (e.g., LED) that emits light toward a subject (e.g., the user's eyes, face, and/or external objects in FoV) photographed by using the camera 740. The light source may include an LED having an infrared wavelength. The light source may be disposed on at least one of the frame 700 and the hinge units 706 and 707.

According to an embodiment, the battery module 770 may supply power to electronic components of the electronic device 101. In an embodiment, the battery module 770 may be disposed in the first temple 704 and/or the second temple 705. For example, the battery module 770 may be a plurality of battery modules 770. The plurality of battery modules 770 may be disposed on each of the first temple 704 and the second temple 705. In an embodiment, the battery module 770 may be disposed in the end of the first temple 704 and/or the second temple 705.

The antenna module 775 may transmit a signal or power to the outside of the electronic device 101 or receive the signal or power from the outside. The antenna module 775 may be electrically and/or operably connected to the communication circuit 220 of FIG. 2. In an embodiment, the antenna module 775 may be disposed in the first temple 704 and/or the second temple 705. For example, the antenna module 775 may be disposed close to a surface of the first temple 704 and/or the second temple 705.

The speaker 240 may output an audio signal to the outside of electronic device 101. The sound output module may be referred to as a speaker. In an embodiment, the speaker 240 may be disposed in the first temple 704 and/or the second temple 705 to be disposed adjacent to the ear of the user wearing the electronic device 101. For example, the speaker 240 may include a second speaker 240-2 disposed adjacent to the user's right ear by being disposed within the first temple 704, and a first speaker 240-1 disposed adjacent to the user's left ear by being disposed within the second temple 705.

The light emitting module may include at least one light emitting element. The light emitting module may emit light of a color corresponding to a specific state or emit light in an operation corresponding to the specific state to visually provide the user with information on the specific state of the electronic device 101. For example, when charging is required, the electronic device 101 may emit red light at a predetermined period. In an embodiment, the light emitting module may be disposed on the first rim 701 and/or the second rim 702.

Referring to FIG. 7B, according to an embodiment, the electronic device 101 may include a printed circuit board (PCB) 790. The PCB 790 may be included in at least one of the first temple 704 and the second temple 705. The PCB 790 may include an interposer disposed between at least two sub PCBs. On the PCB 790, one or more hardware included in the electronic device 101 (e.g., hardware illustrated by different blocks in FIG. 2) may be disposed. The electronic device 101 may include a flexible PCB (FPCB) for interconnecting the hardware.

According to an embodiment, the electronic device 101 may include at least one of a gyro sensor, a gravity sensor, and/or an acceleration sensor to detect a posture of the electronic device 101 and/or a posture of a body part (e.g., a head) of a user wearing the electronic device 101. Each of the gravity sensor and the acceleration sensor may measure gravity acceleration, and/or acceleration based on designated three-dimensional axes (e.g., x-axis, y-axis, and z-axis) perpendicular to each other. The gyro sensor may measure an angular velocity of each of the designated three-dimensional axes (e.g., the x-axis, the y-axis, and the z-axis). At least one of the gravity sensor, the acceleration sensor, and the gyro sensor may be referred to as an inertial measurement unit (IMU). According to an embodiment, the electronic device 101 may identify the user's motion and/or gesture performed to execute or stop a specific function of the electronic device 101 based on the IMU.

Figure 8A:
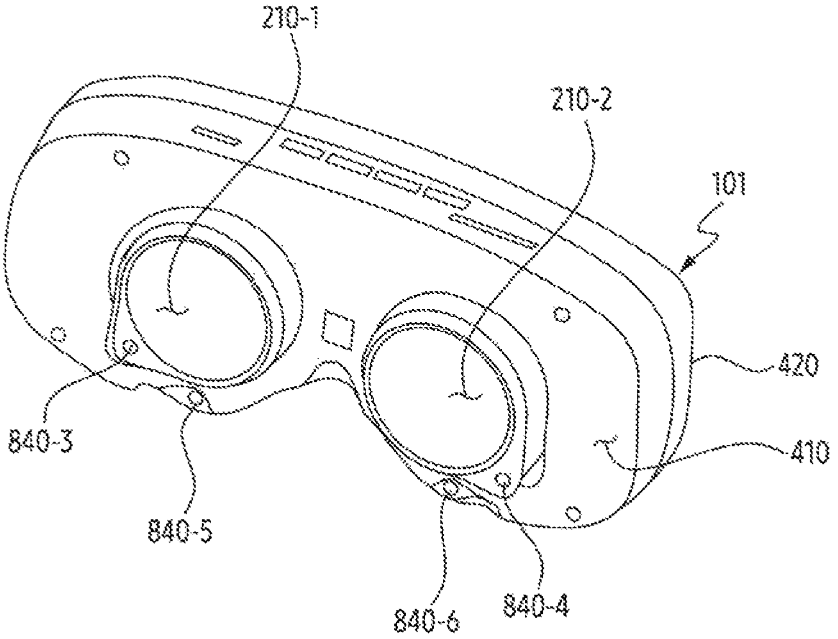
FIGS. 8A to 8B illustrate an example of the appearance of an electronic device, according to an embodiment.
Figure 8B:
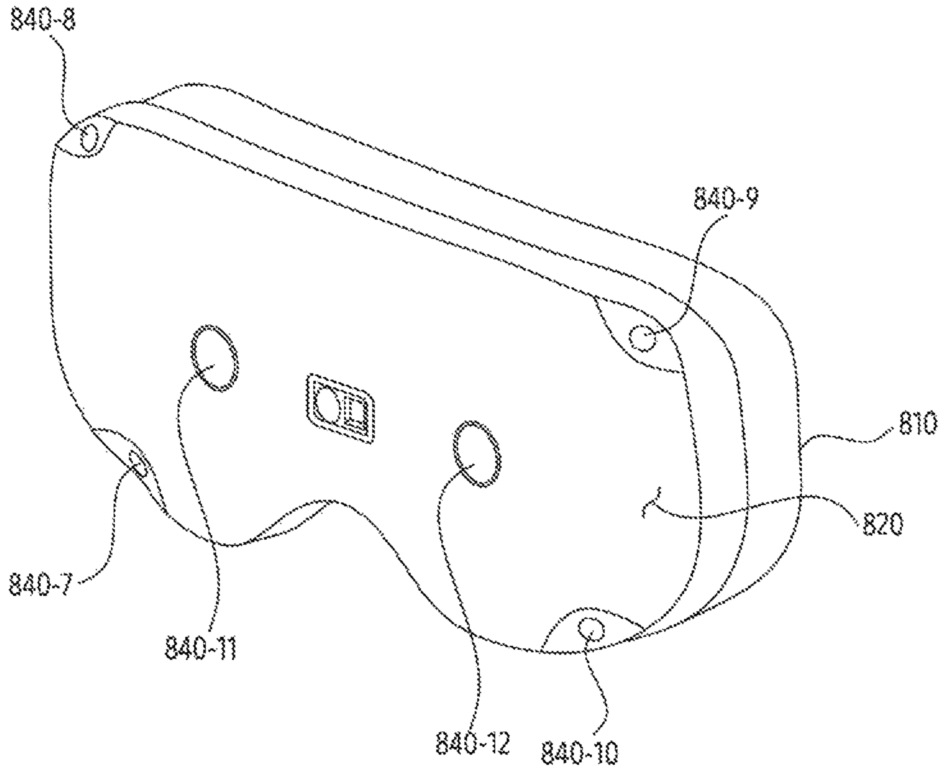

FIGS. 8A to 8B illustrate an example of the appearance of an electronic device according to an embodiment. The electronic device 101 of FIGS. 8A and 8B may be an example of the electronic device 101 of FIGS. 1, 2, 3, 4B, and/or 6 and the electronic device 101 of FIGS. 4A, 5, and/or 6.

Referring to FIG. 8A, according to an embodiment, a first surface 810 of the electronic device 101 may have a shape attachable on the user's body part (e.g., the user's face). The electronic device 101 may further include a strap for being fixed on the user's body part, and/or one or more temples (e.g., the first temple 704 and/or the second temple 705 of FIGS. 7A to 7B). A first display 210-1 for outputting an image to the left eye among both eyes of the user and a second display 210-2 for outputting an image to the right eye among both eyes of the user may be disposed on the first surface 810. The electronic device 101 may further include rubber or silicon packing formed on the first surface 810 and preventing interference by light (e.g., ambient light) different from light propagated from the first display 210-1 and the second display 210-2.

According to an embodiment, the electronic device 101 may include cameras 840-3 and 840-4 for photographing and/or tracking both eyes of the user adjacent to each of the first display 210-1 and the second display 210-2. The cameras 840-3 and 840-4 may be referred to as the ET camera. According to an embodiment, the electronic device 101 may include cameras 840-5 and 840-6 for photographing and/or recognizing a user's face. The cameras 840-5 and 840-6 may be referred to as the FT camera.

Referring to FIG. 8B, cameras 840-7, 840-8, 840-9, 840-10, 840-11, and 840-12 and/or sensors for obtaining information related to external environment of the electronic device 101 may be disposed on the second surface 820 opposite to the first surface 810 of FIG. 8A. For example, cameras 840-7, 840-8, 840-9, and 840-10 may be disposed on the second surface 820 to recognize an external object different from the electronic device 101. For example, by using cameras 840-11 and 840-12, the electronic device 101 may obtain an image and/or video to be transmitted to each of the user's both eyes. The camera 840-11 may be disposed on the second surface 820 of the electronic device 101 to obtain an image to be displayed through the second display 210-2 corresponding to the right eye among the eyes. The camera 840-12 may be disposed on the second surface 820 of the electronic device 101 to obtain an image to be displayed through the first display 210-1 corresponding to the left eye among the eyes.

According to an embodiment, the electronic device 101 may include a depth sensor disposed on the second surface 820 to identify a distance between the electronic device 101 and an external object. Using the depth sensor, the electronic device 101 may obtain spatial information (e.g., depth map) on at least a part of FoV of the user wearing the electronic device 101.

A microphone (e.g., the microphone 230 of FIG. 2) for obtaining sound outputted from an external object may be disposed on the second surface 820 of the electronic device 101. The number of microphones may be one or more according to an embodiment.

As described above, according to an embodiment, the electronic device 101 may have a form factor to be worn on a user's head. The electronic device 101 may provide a user experience based on augmented reality, virtual reality, and/or mixed reality, in a state worn on the head. In a state in which the electronic device 101 outputs an audio signal through a speaker (e.g., the speaker 240 of FIG. 2), a user wearing the electronic device 101 may feel a sense of difference when a volume of the audio signal is different from a volume of an external sound (e.g., sound generated from an external object adjacent to the electronic device 101). In order to compensate for the sense of difference, the electronic device 101 may adjust the volume of the audio signal based on the external sound. The electronic device 101 may realistically reproduce the audio signal by adjusting the volume of the audio signal based on the external sound.

Figure 9:
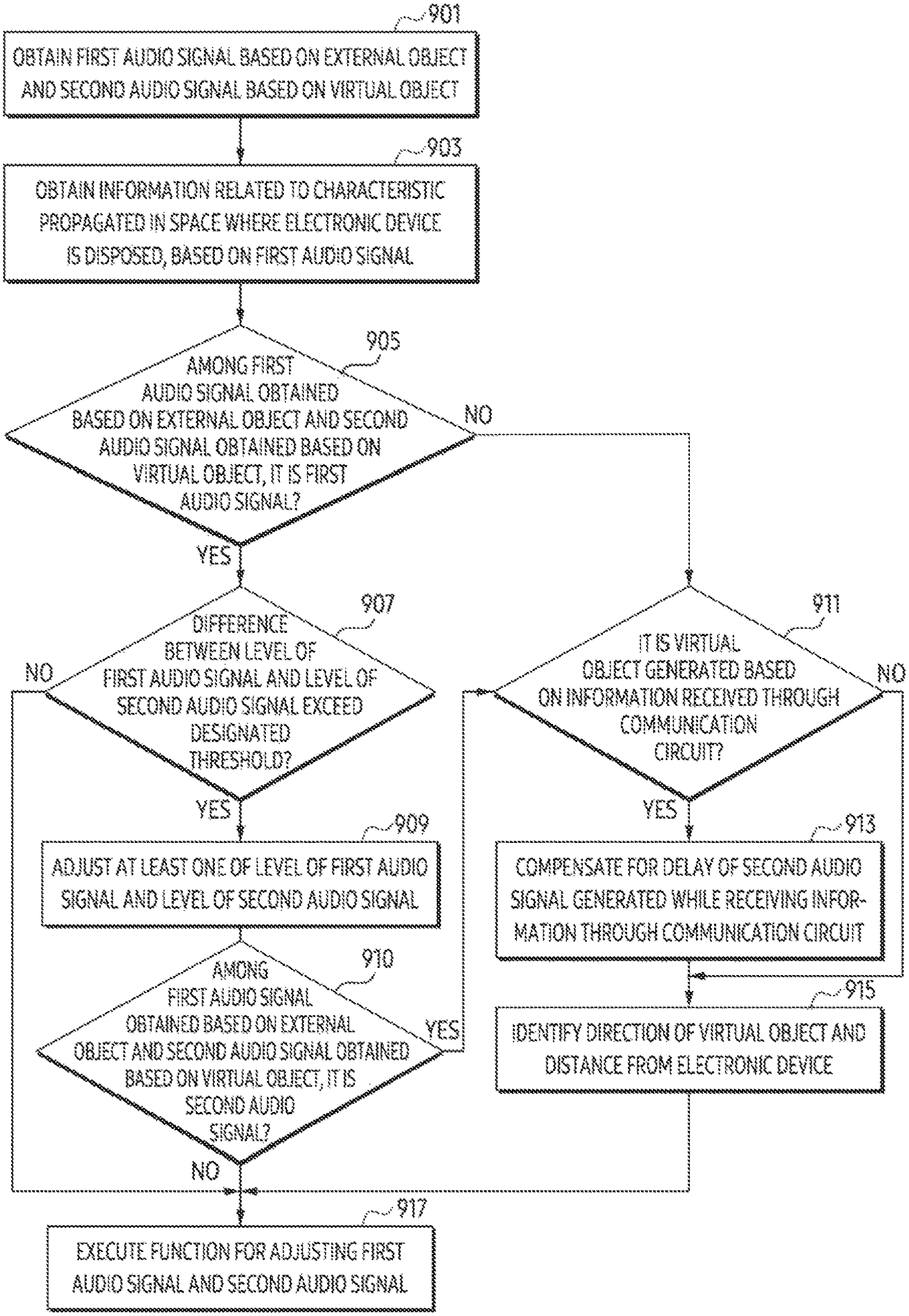
FIG. 9 is an example of a flowchart of an operation of an electronic device, according to an embodiment.

FIG. 9 is an example of a flowchart of an operation of an electronic device, according to an embodiment. The electronic device of FIG. 9 is an example of the electronic device 101 of FIGS. 1, 2, 3, 5, 7A, 7B, 8A, and/or 8B. The electronic device of FIG. 9 is an example of the electronic device of FIGS. 4A, 4B, and/or 6. Operations of FIG. 9 may be executed by the processor 120 of FIGS. 1 and/or 2. The operations in FIG. 9 are examples of operations executed by the electronic device. Sequences of operations described below are not limited to those described below.

Referring to FIG. 9, in operation 901, according to an embodiment, the electronic device may obtain a first audio signal based on an external object (e.g., the external object 310 of FIG. 3). The electronic device may obtain the first audio signal based on an acoustic signal generated from the external object. The electronic device may obtain the first audio signal based on obtaining the acoustic signal generated from the external object and sampling the acoustic signal. The electronic device may obtain a second audio signal based on a virtual object (e.g., the virtual object 321, 323, and 325 of FIG. 3). The electronic device may obtain the first audio signal based on the external object and the second audio signal based on the virtual object. The electronic device may identify the first audio signal obtained based on the external object and the second audio signal obtained based on the virtual object.

In operation 903, according to an embodiment, the electronic device may identify the first audio signal obtained based on the external object. Based on the first audio signal, the electronic device may obtain information related to a characteristic propagated in a space in which the electronic device is disposed. For example, information related to the characteristic propagated in the space in which the electronic device is disposed may be related to a reverberation characteristic in the space where the electronic device is disposed. For example, the reverberation characteristic may be associated with a reverberation time. For example, the reverberation characteristic may be related to the amplitude of the acoustic signal generated from the external object. The reverberation characteristic may be related to a time when the amplitude of the acoustic signal generated from the external object is reduced by a designated amplitude (e.g., about 60 dB). The electronic device may adjust at least one of the first audio signal obtained based on the external object and the second audio signal obtained based on the virtual object, based on information related to the characteristic propagated in the space where the electronic device is disposed. Operation of adjusting at least one of the first audio signal obtained based on the external object and the second audio signal obtained based on the virtual object may be related to operation 917.

In operation 905, according to an embodiment, the electronic device may identify the first audio signal and the second audio signal. The electronic device may identify the first audio signal obtained based on the external object. The electronic device may identify the second audio signal obtained based on the virtual object. The electronic device may identify that the obtained audio signals match the first audio signal among the first audio signal and the second audio signal. The electronic device may identify that the obtained audio signals match the second audio signal among the first audio signal and the second audio signal. The electronic device may identify whether it is the first audio signal among the first audio signal obtained based on the external object and the second audio signal obtained based on the virtual object.

When the audio signal identified by the electronic device is the first audio signal (operation 905-YES), according to an embodiment, in operation 907, the electronic device may identify a level of the first audio signal. The electronic device may identify a level of the second audio signal. The electronic device may identify the level of the first audio signal obtained based on the external object. The electronic device may identify the level of the second audio signal obtained based on the virtual object. The electronic device may identify the level of the first audio signal and the level of the second audio. The electronic device may identify whether a difference between the level of the first audio signal and the level of the second audio signal exceeds a designated threshold. The electronic device may identify that the difference between the level of the first audio signal and the level of the second audio signal is less than or equal to the designated threshold. The electronic device may identify that the difference between the level of the first audio signal and the level of the second audio signal exceeds the designated threshold.

When the difference between the level of the first audio signal and the level of the second audio signal exceeds the designated threshold (operation 907-YES), in operation 909, the electronic device may adjust the level of the first audio signal, according to an embodiment. The electronic device may adjust the level of the second audio signal when the difference between the level of the first audio signal and the level of the second audio signal exceeds the designated threshold. The electronic device may adjust at least one of a level of the first audio signal and a level of the second audio signal. The electronic device may adjust at least one of the level of the first audio signal obtained based on the external object and the level of the second audio signal obtained based on the virtual object.

In operation 910, according to an embodiment, the electronic device may identify whether it is the second audio signal among the first audio signal obtained based on the external object and the second audio signal obtained based on the virtual object. For example, the electronic device may identify obtaining the second audio signal among the first audio signal and the second audio signal. According to an embodiment, the electronic device may execute operation 911 based on identifying the second audio signal among the first audio signal and the second audio signal. According to an embodiment, the electronic device may execute operation 917 based on identifying the first audio signal among the first audio signal and the second audio signal.

When the audio signal identified by the electronic device is the second audio signal (operation 905-NO), in operation 911, according to an embodiment, the electronic device may identify whether the second audio signal is an audio signal generated based on the virtual object generated based on information (or data) received through a communication circuit (e.g., the communication circuit 220 of FIG. 2). Based on the identification of the second audio signal, the electronic device may identify whether the virtual object related to the second audio signal is a virtual object generated using information received through the communication circuit. The electronic device may identify that the virtual object is a virtual object generated based on information received from the external electronic device through the communication circuit, based on the second audio signal obtained based on the virtual object.

When the virtual object is a virtual object generated based on information received through the communication circuit (operation 911-YES), in operation 913, according to an embodiment, the electronic device may compensate for a delay of the second audio signal generated while receiving information for generating the virtual object through the communication circuit. For example, the electronic device may identify the first timing when information for generating the virtual object is transmitted in the external electronic device and the second timing when the information for generating the virtual object is received. The electronic device may identify a duration between the first timing and the second timing. The electronic device may adjust the timing of outputting the second audio signal to compensate for the duration based on identifying the duration between the first timing and the second timing.

In operation 915, according to an embodiment, the electronic device may identify a distance between the virtual object and the electronic device. The electronic device may identify an angle between the virtual object and a direction in which the electronic device views (e.g., the direction 500 of FIG. 5). The angle between the virtual object and the direction in which the electronic device views may be referred to a direction of the virtual object. The electronic device may identify at least one of the direction of the virtual object and the distance between the virtual object and the electronic device. The electronic device may identify the direction of the virtual object and the distance between the virtual object and the electronic device. For example, when it is not the virtual object generated based on information received through the communication circuit (operation 911-NO), the electronic device may identify the direction of the virtual object and the distance between the virtual object and the electronic device.

In operation 917, according to an embodiment, the electronic device may execute a function for adjusting the first audio signal and the second audio signal. The electronic device may execute a function for adjusting at least one of the first audio signal and the second audio signal. The function for adjusting the first audio signal and the second audio signal may include an operation of adjusting the first audio signal and the second audio signal, based on a characteristic propagated in a space where the electronic device is disposed. For example, the electronic device may adjust the first audio signal and the second audio signal based on information related to the characteristic propagated in the space where the electronic device is disposed. For example, the electronic device may adjust the first audio signal and the second audio signal based on the characteristic propagated in the space where the electronic device obtained within operation 903 is disposed. In order to adjust the first audio signal and the second audio signal based on the characteristic propagated in the space, the electronic device may adjust equalizer information of the first audio signal and the second audio signal. The equalizer information may be adjusted by the electronic device to provide the same as hearing to the first audio signal and the second audio signal in a specific place (e.g., indoor, outdoor, concert hall). However, it is not limited thereto.

According to an embodiment, the electronic device may adjust the second audio signal based on the direction of the virtual object and the distance of the virtual object from the electronic device. For example, the electronic device may adjust the level of the second audio signal based on the distance of the virtual object from the electronic device. However, it is not limited thereto.

The above-described operations are an example of an operation of the electronic device, and are not limited thereto. The above-described sequences of operations are an example of the electronic device for adjusting (or changing) audio signals, but are not limited thereto.

As described above, according to an embodiment, an electronic device 101 may comprise a display 210, a speaker 240, a microphone array 230 in which a plurality of microphones 235 are arranged, and a processor 120. The processor 120 may be configured to receive acoustic signals 420 through the plurality of microphones 235 of the microphone array 230, in a state displaying a visual object 310; 321; 323; 325 in the display 210. The processor 120 may be configured to obtain first information related to propagated characteristics of the acoustic signals 420 in a space where the microphone array 230 is disposed, based on the received acoustic signals 420. The processor 120 may be configured to change an audio signal corresponding to the visual object 310; 321; 323; 325, based on the first information and second information for displaying the visual object 310; 321; 323; 325 in the display 210. The processor 120 may be configured to output the changed audio signal, through the speaker 240.

According to an embodiment, the processor 120 may be configured to obtain the first information related to an impulse response by the space with respect to an acoustic signal.

According to an embodiment, the processor 120 may be configured to change the audio signal based on the impulse response identified by the first information.

According to an embodiment, the processor 120 may be configured to obtain azimuth angles by comparing amplitudes of the acoustic signals which is received through each of the plurality of microphones 235, based on a distance interval between the plurality of microphones 235.

According to an embodiment, the processor 120 may be configured to obtain the first information, based on delays between the acoustic signals 420 which is received through each of the plurality of microphones 235.

According to an embodiment, the audio signal may be a first audio signal. The processor 120 may be configured to, in a state that a difference between a level of the acoustic signals 420 and a level of the audio signal exceeds a designated level, output a second audio signal for compensating the acoustic signals 420 and being different from the first audio signal.

According to an embodiment, the acoustic signals 420 may have a first phase. The processor 120 may be configured to output the second audio signal having a second phase which is having a designated phase difference from the first phase of the acoustic signals 420.

According to an embodiment, the electronic device 101 may comprise a communication circuit 220. The processor 120 may be configured to obtain information related to the visual object 310; 321; 323; 325 that is the first visual object 310; 321; 323; 325 and the audio signal that is the first audio signal, through the communication circuit 220.

According to an embodiment, the processor 120 may be configured to identify a delay between the first audio signal and the second audio signal, in a state of obtaining the second audio signal based on an application executed by the processor 120. The processor 120 may be configured to adjust a time point when at least one of the first audio signal or the second audio signal is reproduced, based on the delay.

As described above, according to an embodiment, a method of electronic device 101 may comprise receiving acoustic signals 420 through a plurality of microphones 235 of a microphone array 230, in a state displaying a visual object 310; 321; 323; 325 in display 210. The method of the electronic device 101 may comprise obtaining first information related to propagated characteristics of the acoustic signals 420 in a space where the microphone array 230 is disposed, based on the received acoustic signals 420. The method of the electronic device 101 may comprise changing an audio signal corresponding to the visual object 310; 321; 323; 325, based on the first information and second information for displaying the visual object 310; 321; 323; 325 in the display 210. The method of the electronic device 101 may comprise outputting the changed audio signal, through a speaker 240.

According to an embodiment, the method of the electronic device 101 may comprise obtaining the first information related to an impulse response by the space with respect to an acoustic signal.

According to an embodiment, the method of the electronic device 101 may comprise changing the audio signal based on the impulse response identified by the first information.

According to an embodiment, the method of the electronic device 101 may comprise obtaining azimuth angles by comparing amplitudes of the acoustic signals which is received through each of the plurality of microphones 235, based on a distance interval between the plurality of microphones 235.

According to an embodiment, the method of the electronic device 101 may comprise obtaining the first information, based on delays between the acoustic signals 420 which is received through each of the plurality of microphones 235.

According to an embodiment, the audio signal may be a first audio signal. The method of the electronic device 101 may comprise, in a state that a difference between a level of the acoustic signals 420 and a level of the audio signal exceeds a designated level, outputting a second audio signal for compensating the acoustic signals 420 and being different from the first audio signal.

According to an embodiment, the acoustic signals 420 may have a first phase. The method of the electronic device 101 may comprise outputting the second audio signal having a second phase which is having a designated phase difference from the first phase of the acoustic signals 420.

According to an embodiment, the method of the electronic device 101 may comprise obtaining information related to the first visual object 310; 321; 323; 325 and the first audio signal, through a communication circuit 220.

According to an embodiment, the method of the electronic device 101 may comprise identifying a delay between the first audio signal and the second audio signal, in a state of obtaining the second audio signal based on an application executed by the processor 120. The method of the electronic device 101 may comprise adjusting a time point when at least one of the first audio signal or the second audio signal is reproduced, based on the delay.

As described above, according to an embodiment, a computer readable storage medium storing one or more programs, the one or more programs may be, when executed by a processor 120 of an electronic device 101, configured to receive acoustic signals 420 through a plurality of microphones 235 of a microphone array 230, in a state displaying a visual object 310; 321; 323; 325 in display 210. The one or more programs may be, when executed by the processor 120 of the electronic device 101, configured to obtain first information related to propagated characteristic of the acoustic signals 420 in a space where the microphone array 230 is disposed, based on the received acoustic signals 420. The one or more programs may be, when executed by the processor 120 of the electronic device 101, configured to change an audio signal corresponding to the visual object 310; 321; 323; 325, based on the first information and second information for displaying the visual object 310; 321; 323; 325 in the display 210. The one or more programs may be, when executed by the processor 120 of the electronic device 101, configured to output the changed audio signal, through a speaker 240.

According to an embodiment, the one or more programs may be, when executed by the processor 120 of the electronic device 101, configured to obtain the first information related to an impulse response by the space to an acoustic signal.

According to an embodiment, the one or more programs may be, when executed by the processor 120 of the electronic device 101, configured to change the audio signal based on the impulse response identified by the first information.

According to an embodiment, the one or more programs may be, when executed by the processor 120 of the electronic device 101, configured to obtain azimuth angles by comparing amplitudes of the acoustic signals which is received through each of the plurality of microphones (235), based on a distance interval between the plurality of microphones 235.

According to an embodiment, the one or more programs may be, when executed by the processor 120 of the electronic device 101, configured to obtain the first information, based on delays between the acoustic signals 420 which is received through each of the plurality of microphones 235.

According to an embodiment, the one or more programs may be, when executed by the processor 120 of the electronic device 101, configured to output a second audio signal for compensating the acoustic signals 420 and being different from the audio signal that is the first audio signal, in a state that a difference between a level of the acoustic signals 420 and a level of the audio signal exceeds a designated level.

According to an embodiment, the one or more programs may be, when executed by the processor 120 of the electronic device 101, configured to output the second audio signal having a second phase which is having a designated phase difference from the first phase of the acoustic signals 420.

According to an embodiment, the one or more programs may be, when executed by the processor 120 of the electronic device 101, configured to obtain information related to the visual object 310; 321; 323; 325 that is the first visual object 310; 321; 323; 325 and the audio signal that is the first audio signal, through the communication circuit 220.

According to an embodiment, the one or more programs may be, when executed by the processor 120 of the electronic device 101, configured to identify a delay between the first audio signal and the second audio signal, in a state of obtaining the second audio signal based on an application executed by the processor 120. The one or more programs may be, when executed by the processor 120 of the electronic device 101, configured to adjust a time point when at least one of the first audio signal or the second audio signal is reproduced, based on the delay.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an aspect of the disclosure, an electronic device includes a display; a speaker; a microphone array in which a plurality of microphones are arranged; and a processor configured to: obtain acoustic signals through the plurality of microphones of the microphone array, while displaying a visual object in the display; obtain first information related to propagated characteristics of the acoustic signals in a space where the microphone array is provided, based on the obtained acoustic signals; change an audio signal corresponding to the visual object based on the first information and second information for displaying the visual object in the display; and provide the changed audio signal using the speaker.

The processor may be further configured to obtain the first information according to an impulse response by the space with respect to an acoustic signal among the acoustic signals.

The processor may be further configured to change the audio signal based on the impulse response identified by the first information.

The processor may be further configured to obtain azimuth angles by comparing amplitudes of the acoustic signals which may be obtained through each of the plurality of microphones, based on a distance interval between the plurality of microphones.

The processor may be further configured to obtain the first information, based on delays between the acoustic signals, which may be obtained through each of the plurality of microphones.

The audio signal may be a first audio signal, and wherein the processor may be further configured to, based on a difference between a level of the acoustic signals and a level of the audio signal exceeding a designated level, provide a second audio signal for compensating the acoustic signals, the second audio signal being different than the first audio signal.

The acoustic signals have a first phase, and wherein the processor may be further configured to provide the second audio signal having a second phase having a designated phase difference from the first phase of the acoustic signals.

The electronic device may further include a communication circuit; wherein the visual object may be a first visual object, and wherein the processor may be further configured to obtain information related to the first visual object and the first audio signal through the communication circuit.

The processor may be further configured to: identify a delay between the first audio signal and the second audio signal while obtaining the second audio signal based on an application executed by the processor; and adjust a time point at which at least one of the first audio signal or the second audio signal is reproduced, based on the delay.

According to an aspect of the disclosure a method of an electronic device includes: obtaining acoustic signals through a plurality of microphones of a microphone array, while displaying a visual object in a display; obtaining first information related to propagated characteristics of the acoustic signals in a space where the microphone array is provided, based on the obtained acoustic signals; changing an audio signal corresponding to the visual object based on the first information and second information for displaying the visual object in the display; and providing the changed audio signal using a speaker.

The method may further include obtaining the first information according to an impulse response by the space with respect to an acoustic signal among the acoustic signals.

The method may further include changing the audio signal based on the impulse response identified by the first information.

The method may further include obtaining azimuth angles by comparing amplitudes of the acoustic signals which may be obtained through each of the plurality of microphones, based on a distance interval between the plurality of microphones.

The method may further include obtaining the first information, based on delays between the acoustic signals, which may be obtained through each of the plurality of microphones.

The audio signal may be a first audio signal, and the method may further include, based on a difference between a level of the acoustic signals and a level of the audio signal exceeding a designated level, providing a second audio signal for compensating the acoustic signals, the second audio signal being different than the first audio signal.

The acoustic signals have a first phase, and the method may further include, providing the second audio signal having a second phase having a designated phase difference from the first phase of the acoustic signals.

The method may further include obtaining information related to the visual object and the first audio signal through a communication circuit.

The method may further include identifying a delay between the first audio signal and the second audio signal while obtaining the second audio signal based on an application executed by a processor; and adjusting a time point at which at least one of the first audio signal or the second audio signal is reproduced, based on the delay.

According to an aspect of the disclosure a non-transitory computer readable storage medium is configured to: obtain acoustic signals through a plurality of microphones of a microphone array, while displaying a visual object in a display; obtain first information related to propagated characteristics of the acoustic signals in a space where the microphone array is provided, based on the obtained acoustic signals; change an audio signal corresponding to the visual object, based on the first information and second information for displaying the visual object in the display; and provide the changed audio signal using a speaker.

The non-transitory computer readable storage medium may be further configured to: obtain the first information according to an impulse response by the space with respect to an acoustic signal.

According to an aspect of the disclosure, an electronic device includes: a memory configured to store instructions; and a processor configured to execute the instructions to: obtain acoustic signals through a plurality of microphones of a microphone array while displaying a visual object; obtain first information related to characteristics of the acoustic signals in a space where the microphone array may be provided, based on the obtained acoustic signals; change an audio signal corresponding to the visual object based on the first information and second information for displaying the visual object; and provide the changed audio signal to a speaker.

The processor may be further configured to obtain the first information according to an impulse response by the space with respect to an acoustic signal among the acoustic signals.

The processor may be further configured to change the audio signal based on the impulse response identified by the first information.

The processor may be further configured to obtain azimuth angles by comparing amplitudes of the acoustic signals which may be obtained through each of the plurality of microphones, based on a distance interval between the plurality of microphones.

The processor may be further configured to obtain the first information, based on delays between the acoustic signals, which is obtained through each of the plurality of microphones.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
- a camera;
- a display;
- a speaker;
- a microphone array comprising a plurality of microphones; and
- a processor configured to:
  - display, using the display, a screen representing at least a portion of a field of view (FOV) of the camera, wherein the screen includes:
    - a first visual object corresponding to an external object positioned in a scene corresponding to the FOV, the external object outputting at least one acoustic signal, and
    - a second visual object corresponding to a virtual object;
  - obtain acoustic signals including the at least one acoustic signal of the external object through the plurality of microphones of the microphone array, while displaying the screen;
  - obtain spatial information in which the electronic device is positioned, based on propagated characteristics of the acoustic signals;
  - identify a first relative position between the first visual object and the electronic device, based on a location information of the first visual object in the screen;

identify a second relative position between the second visual object and the electronic device, based on a location information of the second visual object in the screen;

identify, from among the acoustic signals, the at least one acoustic signal of the external object positioned in the scene corresponding to the FOV of the camera;

determine a volume level of a first audio signal corresponding to the at least one acoustic signal, based on the spatial information, the first relative position, the second relative position, and a volume level of a second audio signal associated with the second visual object; and output audio signals including the first audio signal adjusted to the determined volume level and the second audio signal, using the speaker.

2. The electronic device of claim 1, wherein the processor is further configured to obtain the spatial information related to an impulse response of the acoustic signals in a space in which the electronic device is positioned.

3. The electronic device of claim 2, wherein the processor is further configured to change the audio signals based on the impulse response identified by the spatial information.

4. The electronic device of claim 1, wherein the processor is further configured to obtain azimuth angles by comparing amplitudes of the acoustic signals which is obtained through each of the plurality of microphones, based on a distance interval between the plurality of microphones.

5. The electronic device of claim 1, wherein the processor is further configured to obtain the spatial information, based on delays between the acoustic signals, which is obtained through each of the plurality of microphones.

6. The electronic device of claim 1, wherein the processor is further configured to, based on a difference between a volume level of the acoustic signals and a volume level of the first audio signal exceeding a designated level, output a third audio signal for compensating the acoustic signals using the speaker, the third audio signal being different from the first audio signal.

7. The electronic device of claim 6, wherein the acoustic signals have a first phase, and wherein the processor is further configured to output the third audio signal having a second phase which has a designated phase difference from the first phase of the acoustic signals.

8. The electronic device of claim 6, further comprising:

a communication circuit;

wherein the processor is further configured to obtain information related to the second visual object and the second audio signal through the communication circuit.

9. The electronic device of claim 8, wherein the processor is further configured to:

identify a delay between the first audio signal and the third audio signal while obtaining the third audio signal based on an application executed by the processor; and adjust a time point at which at least one of the first audio signal or the third audio signal is reproduced, based on the delay.

10. A method of an electronic device, the method comprising:

displaying, using a display, a screen representing at least a portion of a field of view (FOV) of a camera, wherein the screen includes:

a first visual object corresponding to an external object positioned in a scene corresponding to the FOV, the external object outputting at least one acoustic signal, and a second visual object corresponding to a virtual object;

obtaining acoustic signals including the at least one acoustic signal of the external object through a plurality of microphones of a microphone array, while displaying the screen;

obtaining spatial information in which the electronic device is positioned, based on propagated characteristics of the acoustic signals;

identifying a first relative position between the first visual object and the electronic device, based on a location information of the first visual object in the screen;

identifying a second relative position between the second visual object and the electronic device, based on a location information of the second visual object in the screen;

identifying, from among the acoustic signals, the at least one acoustic signal of the external object positioned in the scene corresponding to the FOV of the camera;

determining a volume level of a first audio signal corresponding to the at least one acoustic signal, based on the spatial information, the first relative position, the second relative position, and a volume level of a second audio signal associated with the second visual object; and outputting audio signals including the first audio signal adjusted to the determined volume level and the second audio signal, using a speaker.

11. The method of claim 10, further comprising obtaining the spatial information related to an impulse response of the acoustic signals in a space in which the electronic device is positioned.

12. The method of claim 11, further comprising changing the first audio signal and the second audio signal based on the impulse response identified by the spatial information.

13. The method of claim 12, further comprising:

obtaining azimuth angles by comparing amplitudes of the acoustic signals which are obtained through each of the plurality of microphones, based on a distance interval between the plurality of microphones.

14. The method of claim 13, further comprising obtaining the spatial information, based on delays between the acoustic signals, which is obtained through each of the plurality of microphones.

15. The method of claim 14, the method further comprises, based on a difference between a volume level of the acoustic signals and a volume level of the first audio signal exceeding a designated level, outputting a third audio signal for compensating the acoustic signals, the third audio signal being different from the first audio signal.

16. The method of claim 15, wherein the acoustic signals have a first phase, and the method further comprises outputting the third audio signal having a second phase having a designated phase difference from the first phase of the acoustic signals.

17. The method of claim 16, further comprising obtaining information related to the second visual object and the second audio signal through a communication circuit.

18. The method of claim 17, further comprising:

identifying a delay between the first audio signal and the third audio signal while obtaining the third audio signal based on an application executed by a processor; and adjusting a time point at which at least one of the first audio signal or the third audio signal is reproduced, based on the delay.

19. A non-transitory computer readable storage medium configured to store one or more programs, wherein the one or more programs are, when executed by a processor of an electronic device, configured to:

display, using a display, a screen representing at least a portion of a field of view (FOV) of a camera, wherein the screen includes:

a first visual object corresponding to an external object positioned in a scene corresponding to the FOV, the external object outputting at least one acoustic signal, and a second visual object corresponding to a virtual object;

obtain acoustic signals including the at least one acoustic signal of the external object through a plurality of microphones of a microphone array, while displaying the screen;

obtain spatial information in which the electronic device is positioned, based on propagated characteristics of the acoustic signals;

identify a first relative position between the first visual object and the electronic device, based on a location information of the first visual object in the screen;

identify a second relative position between the second visual object and the electronic device, based on a location information of the second visual object in the screen;

identify, from among the acoustic signals, the at least one acoustic signal of the external object positioned in the scene corresponding to the FOV of the camera;

determine a volume level of a first audio signal corresponding to the at least one acoustic signal, based on the spatial information, the first relative position, the second relative position, and a volume level of a second audio signal associated with the second visual object; and output audio signals including the first audio signal adjusted to the determined volume level and the second audio signal, using a speaker.

20. The non-transitory computer readable storage medium of claim 19, wherein the one or more programs are, when executed by the processor of the electronic device, configured to:

obtain the spatial information related to an impulse response of the acoustic signals in a space in which the electronic device is positioned.

* * * * *